United States Patent
Dykema et al.

(10) Patent No.: US 12,056,085 B2
(45) Date of Patent: Aug. 6, 2024

(54) DETERMINING INTERNODAL PROCESSOR INTERCONNECTIONS IN A DATA-PARALLEL COMPUTING SYSTEM

(71) Applicant: SambaNova Systems, Inc., Palo Alto, CA (US)

(72) Inventors: Greg Dykema, Palo Alto, CA (US); Aarti Lalwani, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 8 days.

(21) Appl. No.: 18/096,253

(22) Filed: Jan. 12, 2023

(65) Prior Publication Data
US 2023/0229624 A1   Jul. 20, 2023

Related U.S. Application Data

(60) Provisional application No. 63/301,464, filed on Jan. 20, 2022.

(51) Int. Cl.
*G06F 30/18* (2020.01)
*G06F 9/50* (2006.01)
(Continued)

(52) U.S. Cl.
CPC ........ *G06F 15/825* (2013.01); *G06F 13/4068* (2013.01)

(58) Field of Classification Search
None
See application file for complete search history.

(56) References Cited

U.S. PATENT DOCUMENTS 5,754,543 A     5/1998  Seid
7,231,638 B2 *  6/2007  Blackmore ............. G06F 9/544
                                                       711/2
(Continued)

FOREIGN PATENT DOCUMENTS

WO      2010142987 A1    12/2010

OTHER PUBLICATIONS

Dong et al., Low-Cost Datacenter Load Balancing with Multipath Transport and Top-of-Rack Switches, IEEE Transactions on Parallel and Distributed Systems, vol. 31, Issue 10, Apr. 22, 2020, 16 pages.
(Continued)

*Primary Examiner* — Hyun Nam
(74) *Attorney, Agent, or Firm* — Flagship Patents; Sikander M. Khan

(57) ABSTRACT

A computer-implemented method comprises a topological communications configurator (TCC) of a computing system determining a connections-optimized configuration of processors among compute nodes of the system. Processors included in the compute nodes can execute compute workers of an application of the system and can form intranodal segments of an internodal interconnection topology communicatively coupling the intranodal segments. The intranodal segments can be interconnected via an internodal interconnections fabric. The TCC can determine the connections-optimized configuration based on internodal communications costs corresponding to communications routes among the internodal segments via the internodal interconnection fabric. The computing system can comprise the TCC and can comprise a data-parallel computing system.

20 Claims, 5 Drawing Sheets

(51) Int. Cl.
    *G06F 13/40* (2006.01)
    *G06F 15/82* (2006.01)

(56) References Cited

U.S. PATENT DOCUMENTS

| | | | |
|---|---|---|---|
| 7,414,978 | B2 | 8/2008 | Lun et al. |
| 10,698,853 | B1 | 6/2020 | Grohoski et al. |
| 11,574,253 | B2* | 2/2023 | Santos .................. G06N 20/00 |
| 2004/0114569 | A1* | 6/2004 | Naden .................. H04L 45/08 |
| | | | 370/351 |
| 2012/0120803 | A1* | 5/2012 | Farkas ................ H04L 12/4625 |
| | | | 370/235 |
| 2015/0271236 | A1* | 9/2015 | Chen .................. H04L 65/762 |
| | | | 370/535 |
| 2015/0277990 | A1* | 10/2015 | Xiong .................. G06F 8/443 |
| | | | 718/106 |
| 2020/0319324 | A1* | 10/2020 | Au ........................ H04W 48/16 |
| 2021/0035027 | A1* | 2/2021 | Santos .................. G06N 20/00 |
| 2022/0012077 | A1 | 1/2022 | Kumar et al. |
| 2023/0024785 | A1* | 1/2023 | Dutta .................. H04L 47/72 |
| 2023/0229624 | A1* | 7/2023 | Dykema ............... G06F 15/825 |
| | | | 712/201 |
| 2024/0038086 | A1* | 2/2024 | Yang ...................... G06T 17/00 |

OTHER PUBLICATIONS

Heydari, et al, Efficient network structures with separable heterogeneous connection costs, Economic Letters, vol. 134, Sep. 2015, pp. 82-85.

Xue et al., ROTOS: A Reconfigurable and Cost-Effective Architecture for High-Performance Optical Data Center Networks, Journal Lightwave Technology, vol. 38, dated Jun. 16, 2020, pp. 3485-3494.

Yang, Complexity analysis of new task allocation problem using network flow method on multicore clusters, Mathematical Problems in Engineering 2014, 7 pages.

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner

DETERMINING INTERNODAL PROCESSOR INTERCONNECTIONS IN A DATA-PARALLEL COMPUTING SYSTEM

PRIORITY CLAIM

This application claims the benefit of U.S. Provisional Patent Application No. 63/301,464 filed Jan. 20, 2022 (SBNV1081USP01), which is incorporated by reference herein in its entirety.

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

U.S. patent application Ser. No. 16/239,252, filed Jan. 3, 2019, entitled "VIRTUALIZATION OF A RECONFIGURABLE DATA PROCESSOR,"; and U.S. patent application Ser. No. 16/922,975, filed Jul. 7, 2020, entitled "RUNTIME VIRTUALIZATION OF RECONFIGURABLE DATA FLOW RESOURCES,".

FIELD OF THE TECHNOLOGY

The technology disclosed relates to computing systems comprising parallel and pipeline computations. In particular, the technology disclosed relates to parallel/pipeline computing systems for processing dataflow and data-parallel (DP) applications and data transfer among compute units of such systems. The technology disclosed further relates to dataflow and DP computing systems that comprise coarse-grained reconfigurable architectures (CGRAs).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Data-parallel (DP) computing systems can employ multiple compute elements to execute dataflow and/or DP computing applications, such as artificial intelligence, natural language processing, signal processing, and stream processing. The present disclosure relates to managing transfer of application data and/or processing results among multiple compute elements of such systems.

BRIEF DESCRIPTION OF THE DRAWINGS

The drawings included in the present disclosure are incorporated into, and form part of, the specification. They illustrate implementations of the present disclosure (hereinafter, "the disclosure) and, along with the description, serve to explain the principles of the disclosure. The drawings are intended to be only illustrative of certain implementations and are not intended to limit the disclosure.

DETAILED DESCRIPTION

Figure 1A:
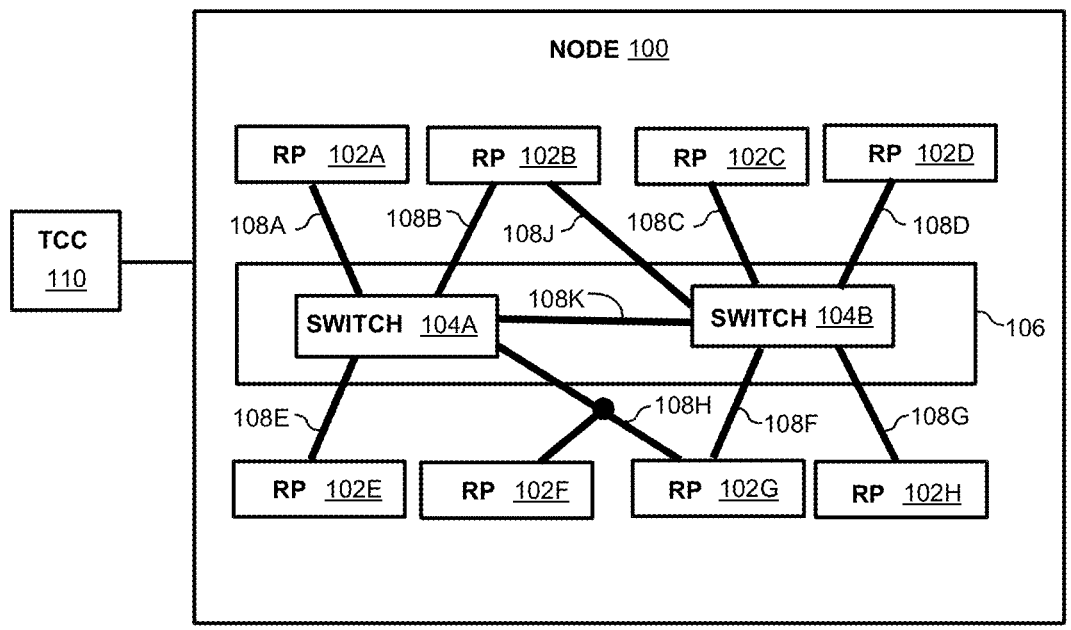
FIG. 1A is a block diagram illustrating an example configuration of reconfigurable processors and example connection costs of communications routes, according to aspects of the disclosure.
Figure 1A:
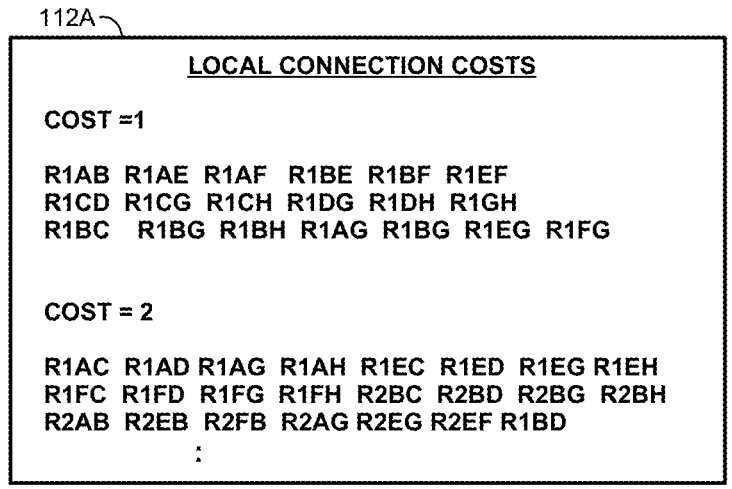
Figure 1A:
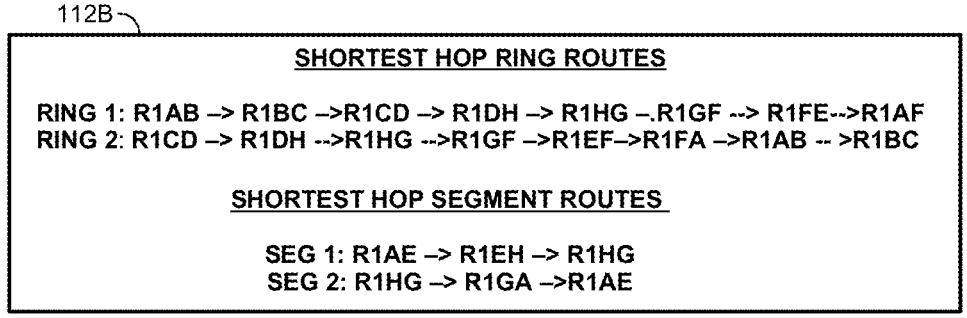

Aspects of the present disclosure (hereinafter, "the disclosure") relate to transferring application data and/or results of computations among multiple compute units of a Data-Parallel (DP) computing system. Aspects of the disclosure particularly relate to configuring compute units in a ring structure to improve, or optimize, communications (e.g., transfer of application data and/or computation results) among the compute units.

Aspects of the disclosure can also particularly apply to configuring processors of a dataflow computing system, such as Central Processing Unit (CPUs), Graphics Processing Units (GPUs), Field Programmable Gate Arrays (FPGAs), Digital Signal Processors (DSPs), processors utilizing Coarse-Grained Reconfigurable Architectures (CGRAs), and/or specialized Application-Specific Integrated Circuits (ASICs) or Application Specific Instruction-set Processor (ASIP). Implementations of the present disclosure (hereinafter, "implementations") can comprise a system, method, or article of manufacture. One or more features of an embodiment can be combined with a base embodiment.

Implementations that are not mutually exclusive are taught to be combinable. One or more features of an embodiment can be combined with other implementations. The disclosure in some instances repeats references to these options. However, omission from some implementations of recitations that repeat these options should not be taken as limiting the combinations taught in the preceding sections—these recitations are hereby incorporated forward by reference into each of the following implementations.

Particular expressions of the disclosure will be understood to have the following operative meanings:

The phrases "at least one"; "one or more"; and "and/or" are to be understood as open-ended expressions that operate both conjunctively and disjunctively. For example, each of the expressions "at least one of A, B, and C", "at least one of A, B, or C", "one or more of A, B, and C", "one or more of A, B, or C", and "one or more of A, B, and/or C" means A alone, B alone, C alone, A and B together, A and C together, B and C together, or A, B, and C together.

The term "a" or "an" entity refers to one or more of that entity. As such, the terms "a"/"an", "one or more", and "at least one" can be used interchangeably herein.

The terms "comprising", "including", and "having" can be used interchangeably herein.

As used herein, "incorporated subject matter" refers, collectively, to subject matter disclosed, and/or otherwise encompassed, among the disclosures incorporated herein by reference. For purposes of illustrating the disclosure, but not intended to limit implementations, various terms of the disclosure are drawn from the incorporated subject matter. As used herein, unless expressly stated otherwise, such terms as may be found in the incorporated subject matter have the same meanings, herein, as their meanings in their respective incorporated disclosures.

Aspects of the disclosure can be appreciated through a discussion of particular example applications, methods, and systems. However, such examples are for only purposes of illustrating the disclosure, and not intended to limit implementations. Various modifications to the disclosed examples will be readily apparent to those of ordinary skill in the art, and the general principles defined herein may be applied to other implementations of the disclosure without departing from the spirit and scope of the disclosure.

While implementations of the disclosure are amenable to various modifications and alternative forms, elements of the disclosure are shown by way of example in the drawings and descriptions thereof. It should be understood, however, that the intention is not to limit the disclosure to the particular example implementations described herein, but to encompass all modifications, equivalents, and alternatives falling within the spirit and scope of the disclosure. Thus, the disclosure is not intended to be limited to the implementations shown but is to be accorded the widest scope consistent with the principles and features disclosed herein.

Turning now to more particular aspects of the disclosure, certain types of computing applications can be referred to as "dataflow "applications, as the application data and computational results "flow" through successive processing elements of a dataflow computing system. Examples of such dataflow applications include machine learning (ML) and deep machine learning (DML) methods of Artificial Intelligence (AI) applications; image processing; stream processing (e.g., processing of streaming video and/or audio data); natural language processing (NLP); and/or recommendation engines. A dataflow computing system can execute computations of a dataflow application concurrently by a pipeline of computational elements (processors and/or programs executing on processors, of a dataflow computing system).

Dataflow computing systems can comprise reconfigurable processing elements (reconfigurable processors, "RPs") particularly designed and/or configured to efficiently perform dataflow processing applications. Reconfigurable processors, such as field programmable gate arrays FPGAs and/or CGRA-based processors, can be configured to implement a variety of computational and/or data transfer functions more efficiently or faster than might be achieved using a general-purpose processor executing a computer program. Prabhakar, et al., "Plasticine: A Reconfigurable Architecture for Parallel Patterns," ISCA '17, Jun. 24-28, 2017, Toronto, ON, Canada, (hereinafter, "Prabhakar") describes example CGRAs and, systems utilizing such CGRAs, that can be particularly advantageous in dataflow computing system. Accordingly, aspects of the disclosure relate to methods and systems utilizing reconfigurable dataflow resources, such as resources of a CGRA. However, the disclosure is not necessarily limited to such applications and/or computing systems.

As used herein, the term "CGRA" refers interchangeably to a coarse grain reconfigurable architecture and a computing hardware embodiment—such as an integrated circuit, chip, or module—based on, or incorporating, a coarse grain reconfigurable architecture. In implementations, systems based on, and/or incorporating, CGRAs, such as the example of Prabhakar, can be particularly adaptable to, and increasingly efficient in, performing dataflow processing. Hardware resources of a CGRA (e.g., PCUs, PMUs, tiles, networks, and/or network interfaces) can comprise one or more Integrated Circuits (ICs). As used herein, the term "chip" refers to an IC (or, combination of ICs) that can embody elements of a CGRA. A chip can typically be packaged in a chip module (e.g., a single chip module, "SCM" or, alternatively, a multi-chip module, "MCM").

As used herein, the term "reconfigurable dataflow system (RDS)" refers to a computing system that is based on, and/or can utilize, reconfigurable dataflow resources, such as resources of CGRAs, to perform operations of dataflow applications. Owing to reconfigurability, reconfigurable dataflow systems can perform these operations more efficiently than systems comprising fixed or non-reconfigurable resources. As also used herein, the term "application" refers to any computing application (e.g., software program), and/or computing system, that utilizes an RDS, to perform algorithms and/or computations of the application. An application can execute, for example, on a processor included in, or coupled to, an RDS.

U.S. Nonprovisional patent application Ser. No. 16/239,252, "VIRTUALIZATION OF A RECONFIGURABLE DATA PROCESSOR", to Grohoski, et al, (hereinafter, "Grohoski"), and U.S. Nonprovisional patent application Ser. No. 16/922,975, "RUNTIME VIRTUALIZATION OF RECONFIGURABLE DATA FLOW RESOURCES", to Kumar, et al, (hereinafter, "Kumar"), both incorporated herein by reference, illustrate example implementations of a reconfigurable dataflow architecture and reconfigurable dataflow systems. As illustrated by the examples of Kumar (e.g., Kumar FIG. 10), one embodiment of an RDS comprises a plurality of physical racks each comprising one or more compute nodes (hereinafter, for brevity, "nodes"). Kumar FIG. 10 further illustrates the nodes each comprising a host processor, a runtime processor and a plurality of reconfigurable processors.

In implementations, an RP can comprise dynamically configurable processing elements with dynamically configurable interconnections. Dynamically configurable refers to configuring processing elements and/or interconnections of processing elements when executing a dataflow application using those resources. As illustrated by the examples of Grohoski and Kumar (e.g., Grohoski FIGS. 2 and 3, or Kumar FIGS. 17-18A), dynamically configurable processing elements of RPs can comprise one or more arrays ("tiles") of configurable processors (pattern compute units, "PCUs") and/or memory units (pattern memory units, "PMUs"). Within a tile the PCU processing and memory units can be interconnected by an array level network (ALN) of switches. Tiles can be interconnected to form larger arrays of configurable processing elements (e.g., in Kumar FIG. 17, tiles 1 and 2 interconnected via interfaces 1712 and 1715).

Nodes of a computing system such as an RDS can comprise a logical and/or physical organization of processors of the system. For example, a node can comprise one or more circuit boards (e.g., a motherboard) and processors of a node, such as RPs, can comprise ASICs integrated onto the circuit boards. A node can correspond, logically, to a set of processors (e.g., ASICs) integrated onto circuit boards of the system.

More particularly, in implementations a node of a computing system can be characterized by communications fabrics interconnecting processors of the computing system. Processors within the same node can communicate amongst each other via an internodal communication fabric. Processors of different nodes communicate, instead, via an intranodal fabric. An internodal fabric can have higher communications latencies among processors communicatively coupled via the internodal fabric than processors communicatively coupled via an intranodal fabric.

For example, a node can comprise processors integrated on an electronic chip (e.g., an ASIC) and the chip can include an intranodal fabric to interconnect processors within the chip. A chip can be physically packaged on a multi-chip module (MCM) and the MCM can include an internodal fabric to facilitate communications between chips (nodes) of the same MCM. The intranodal fabric of the chip can be a lower latency communications path via the internodal fabric between processors within the chip than the latency of communications paths between processors of different chips within the MCM.

Similarly, a node can be as illustrated by the examples of Kumar, comprising a host processor and RPs within the node. The node can include an intranodal fabric and different nodes can be communicatively interconnected via an internodal fabric. The intranodal fabric within the nodes can have a lower latency communications path between processors within the node than the latency of communications paths, via the internodal fabric, between processors of different nodes. Thus, while nodal boundaries can correspond, in some implementations, to physical packaging boundaries of a computing system, as used herein, a "node", and a nodal boundary, is determined based on processors within a node configured to communicate via an intranodal fabric interconnecting only processors within the node and multiple such nodes interconnected via an internodal fabric to facilitate communications among processors of different nodes.

Implementations can, optionally, comprise reconfigurable dataflow units (RDUs) of an RDS. RDUs can comprise, for example, a set of RPs, I/O interfaces, and, optionally, a memory. An RDU can comprise an ASIC, or chip, integrating the RPs, I/O interfaces, and/or memories of the RDU. In an RDS, RPs of a node can comprise RPs of one or more such RDUs. I/O interfaces of an RDU can serve to interconnect the RDU, and/or RPs of the RDU, to other RDUs and/or RPs of the other RDUs. For example, in Kumar FIG. 17, I/O interface 1705 can be an interface to a top-level network (TLN) that can interconnect tiles 1 and/or 2 of to tiles of other RDUs of the same and/or differing nodes. The RPs and/or RDUs can be included in the same or different nodes.

With respect to implementations that comprise RDUs, hereinafter references to "RP", or "RPs", except where otherwise expressly limited to an individual RP, further imply, RDUs that can include an RP. For example, in referring to an RP of a node, and/or interconnections of RPs of a node, "RP" implies also an RDU of a node that includes the RP, and/or interconnections of an RDU that includes the RP with other RDUs (or, with RPs of other RDUs) in the same and/or different nodes.

An RDS can configure RDUs and/or RPs, in the same and/or different nodes, to execute application computations, and to transfer application data/computational results among the RDUs/RPs. An RDS can dynamically configure RDUs/RPs, individually and/or collectively, to perform particular algorithms (e.g., AllReduce and/or gradient descent) of an application, and/or computations (e.g., matrix and/or tensor computations) of an application. In implementations a runtime processor, for example, can distribute application "work" (application computations) to particular RDUs and/or RPs, and can do so to maximize parallelization of application work among the RDS computational resources (e.g., RPs). For example, Kumar FIG. 1 depicts RDS 100 comprising runtime processor 166. In implementations, a runtime processor, such as 166, can manage (e.g., schedule, initiate, and/or control) execution of application work among RDS resources, such as nodes and/or RPs of Kumar FIG. 16. As illustrated in the examples of Kumar FIGS. 1 and 16, a runtime processor can comprise software programs (e.g., programs of a runtime library, as illustrated in Kumar FIG. 3), which can be executable on a CPU of a host processor, such as a CPU of a host processor included in a node of an RDS such as the example of Kumar FIG. 16.

Features of the disclosure, such as methods and/or structures, are described herein using the example of an RDS embodiment of a Dataflow computing system, such as illustrated in the examples of Prabhakar, Grohoski, and Kumar. In particular, features of the disclosure are described with reference to nodes of an RDS comprising nodes, and the nodes comprising RPs, such as described in the example implementations of Grohoski and Kumar. However, this is not intended to limit implementations and it would be apparent to one of ordinary skill in the art to apply features of the disclosure to computing systems other than an RDS and/or Dataflow computing system, without physical nodes or having nodes alternative to the example of Kumar, and to processing elements of a computing system other than RPs such as described in Grohoski and Kumar. Thus, references herein to an "RDS", and/or components thereof, such as nodes, RDUs, and/or RPs, are understood to be only illustrative of the disclosure and not limiting to implementations.

In a dataflow application pipeline a dataflow "worker" can perform one set of computations of the application and forward the results of those computations to a successor worker that performs computations of the application on the forwarded results. A dataflow worker comprises one or more hardware processors (i.e., an aggregation or combination of processors forming a dataflow worker) of a computing system that executes a set of computations of a dataflow application. A dataflow worker can (but need not necessarily) comprise programs executable on the hardware processors.

Processors of a dataflow worker can comprise a CPU, a GPU, an FPGA, and/or a CGRA, for example. Processors of a dataflow worker can comprise reconfigurable processors, such as RDUs, RPs, and/or tiles of RPs in an RDS. As used herein, "dataflow processor" refers to a hardware processor of a dataflow worker. The disclosure frequently uses the example of an RP as a dataflow processor, and references herein to "RP" as a processor of a dataflow worker apply interchangeably to an RP as a whole (e.g., an RDU) and a subset of processing elements of an RP, such as tiles and/or PCUs of tiles of an RP.

Using the example of an RDS having RPs as dataflow processors, the RDS can configure multiple dataflow workers in a worker logical topology (e.g., a logical ring, tree, mesh, etc.) to perform computations of dataflow applications concurrently and can allocate particular RPs of the RDS to execute the dataflow workers (e.g., execute programs and/or operations of the workers). An RDS can allocate RPs to execute the dataflow workers among multiple RPs of the same and/or differing nodes. An RDS can physically interconnect RPs, in a physical interconnection topology corresponding to a worker logical topology, to enable dataflow workers to communicate (e.g., transfer application data and/or computational results within a pipeline or among parallel processing units) amongst each other while executing an application. As used herein, the term "physical interconnection topology" refers to an interconnection topology of dataflow processors, comprising physical interface connections among dataflow processors, physical interconnect fabrics interconnecting dataflow processors, and/or physical interconnection interfaces interconnecting dataflow processors and interconnection fabrics.

According to the algorithms utilized by an application, an application and/or an RDS can configure dataflow workers in varying logical interconnection topologies of the workers (worker logical topologies). In many dataflow applications, such as AI applications, dataflow workers can be configured to form a pipeline comprising predecessor workers forwarding application data and/or computational results to successor workers in the pipeline. A pipeline can include feedback paths, in which one or more successor workers can forward computational results to one or more predecessor workers in the pipeline (e.g., a in computations to perform gradient descent of worker computational results).

A logical ring is one example of a worker logical topology that includes a feedback path, with a successor worker (e.g., a last successor) of a pipeline forwarding computational results to a predecessor worker (e.g., a first predecessor) of the pipeline. Many dataflow applications or, operations of dataflow applications, can lend themselves to configuring dataflow workers to form a logical ring topology (hereinafter, "DPW ring"). For example, a common algorithm employed in machine learning applications is AllReduce. An RDS can configure a set of dataflow workers to form a DPW ring to execute an AllReduce algorithm.

In a DPW ring each worker can be communicatively coupled directly, within the ring, to exactly two other workers: a predecessor worker, that inputs data into that worker, and a successor worker that receives data output from that worker. As AllReduce can represent pipelining of application operations among workers and/or workers in many dataflow applications, for purposes only of illustrating the disclosure, but not intended to limit implementations, the disclosure is illustrated using the example of an RDS configuring dataflow workers (e.g., configuring physical interconnections of dataflow processors of dataflow workers) comprising RPs based on a DPW ring topology. However, it will be understood by one of ordinary skill in the art that dataflow workers, and associated RDS processing elements, such as RPs, can be configured in a logical and/or physical topology other than a ring (e.g., a tree or mesh topology).

Similarly, a feedback path, from a successor to predecessor workers, or RPs of workers, is not necessarily limited to ring topologies, and workers/RPs of other topologies (e.g., trees, or meshes, such as in a convolutional neural network) can include feedback paths from one or more successor workers/RPs to one or more predecessor workers/RPs in a complete logical worker topology and corresponding RP physical interconnection topology (hereinafter, "RP interconnection topology"). Such a feedback path can comprise, for example, another ring topology of a set of workers/RPs within the totality of workers/RPs. As used herein, a "closed topology" of a complete worker logical topology, and/or an RP interconnection topology, can comprise a feedback path (or, paths) through between any arbitrary successor and predecessor workers and/or RPs executing the workers.

In a pipeline topology, a "segment" of a dataflow worker pipeline can comprise a subset of dataflow workers within the pipeline and, correspondingly, RPs executing the workers. A corresponding pipeline of RPs can, similarly, comprise a subset of RPs allocated to execute the dataflow workers within the pipeline. As used herein, a "segment" comprises a subset of dataflow workers and/or associated RPs of a pipeline, having a "first predecessor" worker/RP at the start of the segment and a "last successor" worker/RP at the end of the segment.

An RDS can configure RPs to enable dataflow workers to communicate using varying physical (i.e., hardware) interconnects, and various RP interconnection topologies utilizing those interconnections. An RP interconnection topology can, but need not necessarily, correspond to an RP logical topology. As used herein, the term "interconnect", as a noun, refers to a particular hardware mechanism (e.g., a set of wires or cables and hardware interfaces comprising an I/O link) to connect RPs, and/or RDUs that include the RPs, to other RPs and/or RDUs, of the same and/or different nodes. Further, as used herein as a noun, "interconnect" encompasses the interconnect hardware interfaces and protocols associated with a particular interconnect hardware mechanism.

Correspondingly, except where expressly characterized otherwise (e.g., as "logical"), the terms "interconnection" and "interconnected" refer to a physical coupling of nodes, RDUs, and/or RPs via physical interconnects of a computing system such as an RDS. Interconnecting RPs can comprise interconnecting RPs within the same node, and/or in differing nodes. Accordingly, references to "internodal" interconnections of RPs and/or RDUs, unless particularly characterized otherwise as "intra" nodal, mean interconnections of RPs and/or RDUs residing in different nodes of system (e.g., different nodes of an RDS).

The particular physical interconnects coupling RPs within a node, and coupling RPs/RDUs in different nodes, can form interconnection fabrics (e.g., a network of interconnects, such as a switching network interconnecting RDUs). RPs that co-reside within the same node can be considered "local" to each other and RPs local to each other can communicate using physical interconnects within a node and, optionally, an intranodal fabric interconnecting RPs within the node, such as previously described. an intranodal fabric can be comprise, for example, an interconnection of I/O (e.g., Peripheral Component Interface, "PCI") buses and/or I/O links (e.g., PCI-Express, "PCI-E", links) physically coupling the RPs within an RDU. an intranodal fabric can include switches to interconnect the I/O buses and/or links.

Also as previously described, RPs that are in differing nodes can communicate with each other via an internodal fabric, and associated interconnects to that fabric. An internodal fabric can comprise, for example, an interconnection of InfiniBand (IB) and/or Ethernet links and can include switches to interconnect the IB and/or Ethernet links. An internodal fabric can include interconnects to communicatively, and/or operatively, couple intranodal fabrics among different nodes.

The interconnection of RPs via intranodal and/or internodal fabrics, and physical interconnections coupling RPs, RDUs, and or nodes of a system to intranodal and/or internodal fabrics, form a physical interconnection topology. As used herein, "RP interconnection" and "RP interconnection topology" refer to physical interconnects and/or interconnection fabrics that form a physical interconnection topology among RPs, or groups of RPs, whether intranodal or internodal, that comprises, to communicatively couple RPs within a computing system.

The physical interconnects and interconnection topologies forming an RP interconnection topology can have differing data transfer rates and/or latencies, differing data transfer bandwidths, interconnect utilization, and/or other performance characteristics. Thus, the underlying physical interconnections, interconnection fabrics, and/or location of RPs, RDUs, and/or nodes within an interconnection topology, can affect performance and other aspects (e.g., hardware resource utilizations) of the RPs allocated to dataflow workers to execute an application.

To improve, or optimize, execution performance of the dataflow workers, an RDS can include a "topological communications configurator" (TCC) to determine optimal configurations of RPs allocated to execute dataflow workers in a particular logical topology based on underlying RP interconnection topologies. As used herein, RPs "allocated" to execute refers interchangeably to RPs actually allocated (e.g., bound at runtime to an application) and to RPs that can be allocated, such as RPs available within an RDS to allocate and/or RPs that can be allocated based on an optimal interconnection (e.g., as determined by a TCC) to execute dataflow workers in a particular worker logical topology.

In implementations, a TCC can comprise, for example, a component (e.g., a backend program) of a host and/or runtime processor of a node, and/or a computing system coupled to the RDS. A TCC component of an RDS can determine a "connections-optimized" configuration (arrangement or connectivity-order) of RPs based on underlying RP interconnection topology that can form communications routes, through the RP interconnection topologies, among RPs and dataflow workers executing on those RPs. A connection route can comprise a set of interconnections and/or interconnection fabrics between pairs of RPs.

For example, a connection route between RPs can include one or more interconnection fabrics, or paths through interconnection fabrics, coupling a pair of RPs (and/or, a set of RPs more than 2). Interconnection fabrics included in a communications route between particular RPs can include, for example, particular ALNs, TLNs, or sub-arrays of an ALN or TLN; particular switches and/or ports of switches, of an ALN or TLN; and/or other particular other networks, such as Ethernets and InfiniBand networks. A connection route between RPs can include interconnection interfaces, such as I/O buses, data/memory buses, I/O links, network interfaces, and so forth, that can connect RPs directly to each other, can RPs to an interconnection fabric, and/or can connect interconnection fabrics intervening between RPs.

As used herein, the term "connections-optimized" refers to a communication routes among RDS processing elements (e.g., RPs) optimized based on best performing communications routes among the processing elements through RDS interconnection topologies. Correspondingly, as used herein the term "connections-optimized RP configuration" refers to an RP interconnection topology based on best performing RP communications routes, through intranodal and/or internodal interconnection topologies, among RPs allocated to execute dataflow workers in a worker logical topology. However, in implementations, a "connections optimized RP configuration" can encompass processors, or processing elements, alternative to and/or including RPs.

A connections-optimized RP configuration can correspond, for example, to a highest performance communications route (hereinafter, for brevity, "route") coupling RPs executing dataflow workers within a worker logical topology (e.g., a DPW ring). To determine a connections-optimized RP configuration, a TCC can determine—retrieve, such as from a hardware description of an RDS, or a database, or, alternatively, can compute—"connection costs". In implementations connections costs can be based on communication metrics, which can comprise, for example, a shortest route (e.g., number of hops, or overall latency), a lowest data transfer latency, a highest data transfer bandwidth, utilization of shared interconnects (e.g., shared interconnects to an interconnection fabric), and/or utilization of interconnection fabrics, associated with communications routes among the RPs.

A connections-optimized RP configuration can correspond, for example, to a "lowest-cost" RP interconnection topology of RPs allocated to execute dataflow workers. In an embodiment, a lowest cost RP interconnection topology can correspond to a highest communications performance interconnection topology of all RPs allocated to execute interconnection topology. Accordingly, a lowest cost RP interconnection topology can comprise, for example, a lowest aggregate connections cost (e.g., a sum of costs) computed using connections costs associated with each communications route (e.g., communications routes between pairs of RPs in a pipeline topology) interconnecting RPs within an RP interconnection topology. A TCC can determine a connections-optimized configuration of RPs based on communications costs associated with alternative routes among RPs within and/or among nodes.

For example, to determine a connections-optimized RP configuration to execute dataflow workers of a DPW ring, a TCC can compute connection costs of alternative RP interconnections among pairs of RPs allocated to execute the dataflow workers in the ring. Based on connection costs a TCC can determine a connections-optimized RP configuration allocated to execute the dataflow workers as a logical ring. As used herein, the term "connections-optimized configuration" of RPs refers to an RP interconnection topology determined based on optimal (e.g., highest communications performance) connection costs associated with communications routes among RPs allocated to execute operations of an application (e.g., execute dataflow workers).

It is to be noted that Drawings of Grohoski use the term "FIG." to refer to figures of the Drawings of Grohoski, and the disclosure similarly uses the term "FIG." to refer to figures of the Drawings of the disclosure. Accordingly, in the ensuing description of the Drawings of the disclosure, except where particularly identified as a drawing of Grohoski (e.g., "FIG. 1 of Grohoski", "Grohoski FIG. 1"), as used herein the term "FIG." refers to figures of Drawings of the disclosure (hereinafter, "the Drawings").

Figure 1B:
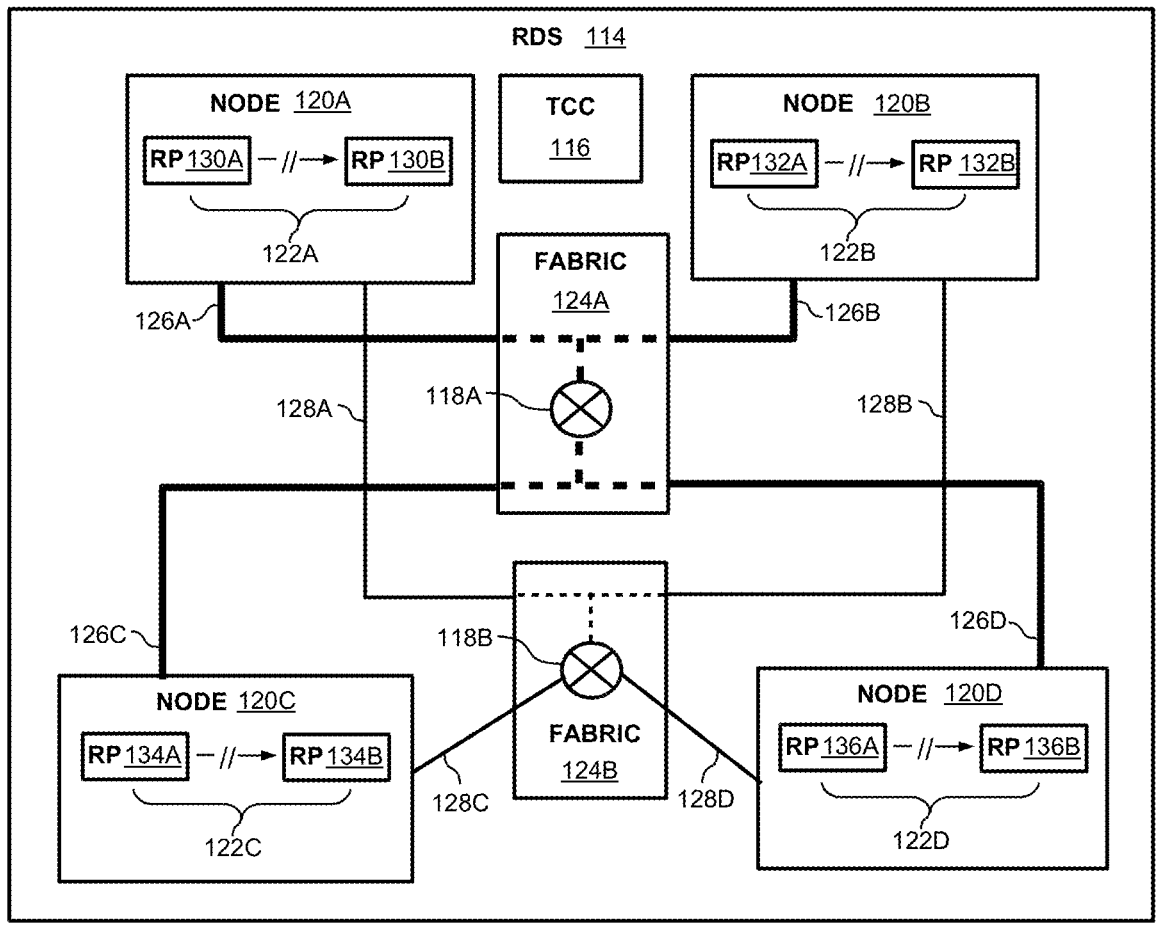
FIG. 1B is a block diagram illustrating an example multi-node reconfigurable dataflow system and example connection costs, sorted pairs of nodes, and internodal communications routes, according to aspects of the disclosure.
Figure 1B:
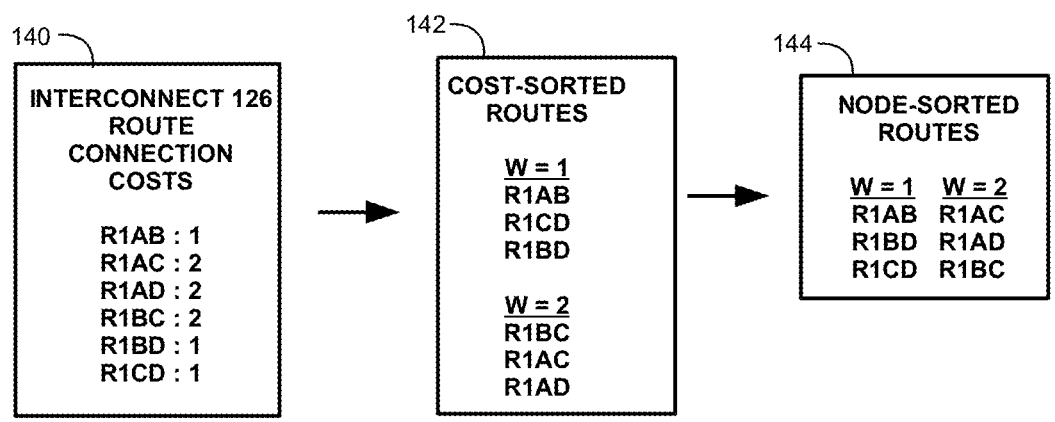

In some instances, dataflow workers of an application can require only RPs included within a single node, while in other instances, dataflow workers of an application can require RPs included multiple nodes. In the case of RPs within a single node, a TCC can determine a connections-optimized RP configuration of the RPs using only intranodal interconnects and/or intranodal fabrics. FIG. 1A illustrates this case. In the alternative case of RPs among multiple nodes, a TCC can determine an intranodal connections-optimized RP configuration of RPs within each node, forming connections-optimized segments within the nodes of an overall RP interconnection topology. The TCC can then determine a complete connections-optimized RP configuration of all of the RPs, among the respective nodes, by interconnecting two or more node-intranodal segments. FIG. 1B illustrates an example of such a case.

In FIG. 1A example node 100 is shown comprising RPs 102A, 102B, 102C, 102D, 102E, 102F, 102G, and 102H (collectively, "RPs 102") communicatively coupled via respective interconnects 108A, 108B, 108C, 108D, 108E, 108F, 108G, 108H, and 108J (collectively, "interconnects 108") to fabric 106 (hereinafter, "fabric 106"). In implementations, node 100 can be, for example, a node similar to nodes of an RDS illustrated in the example of Kumar FIG. 10. Thus, while not shown in FIG. 1A, node 100 can comprise a host processor and/or a runtime processor. In implementations RPs among RPs 102 can comprise, for example, RPs such as previously described. An RDS can allocate RPs among RPs 102 (or portions of RPs 102, such as tiles and/or PCUs of tiles) to execute a dataflow worker. While not shown explicitly in FIG. 1A, RPs among RPs 102 can be RPs of the same and/or of differing RDUs of node 100.

Fabric 106 can comprise an intranodal fabric interconnecting RPs 102 to facilitate communications among RPs 102. For purposes only of illustrating the disclosure but not intended to limit implementations, FIG. 1A further depicts fabric 106 comprising switches 104A and 104B (collectively, "switches 104") coupled by interconnect 108K. Interconnects among interconnects 108 can be any type of interconnect suitable to operatively couple respective RPs among RPs 102 to switches 104. For example, interconnects among interconnects 108 and/or interconnect 108K can comprise PCI-E links, or other I/O links or interconnects, that can connect to and operate with switches of a switching network, such as fabric 106. In implementations fabric 106 can comprise any form of communications fabric, such as buses and/or I/O links interconnected without switches, capable of communicatively interconnecting RPs 102. While not shown in FIG. 1A, fabric 106 can include direct (e.g., point-to-point) connections between pairs of RPs and a TCC can determine an intranodal connection cost associated with the direct connections.

FIG. 1A further depicts TCC 110 coupled to node 100. In implementations, TCC 110 can be a TCC of an RDS, or of a computing system coupled to an RDS. TCC 110 can be, for example, a component of a runtime processor, and/or a program executable on a runtime processor, to determine connections-optimized RP configurations to execute dataflow workers in a worker logical topology.

In the case that a dataflow worker logical topology requires only RPs of node 100, TCC 110 can determine a connections-optimized configuration of the RPs to form a complete worker logical topology, such as a complete DPW ring. TCC 110 can determine a connections-optimized configuration of the RPs based on connection costs associated with the underlying interconnects and interconnect topology of node to form alternative routes among, for example, pairs of RPs of node 100. As a logical topology of RPs allocated to dataflow workers can correspond to a logical topology of those workers, connection-optimized communications routes among RPs within a node 100 can correspond to connection-optimized communications routes among dataflow workers executing on those RPs. An RDS can then configure the RPs (e.g., RPs, and/or RDUs including the RPs) to execute the dataflow workers based on the connections-optimized RP configuration.

In implementations, a TCC can determine interconnects and interconnection topologies of particular RPs allocated to execute dataflow workers from, for example, a hardware description of a node, and/or of components of a node, or via inputs of an applications programming interface (API) of the TCC. A TCC can determine (e.g., based on a hardware description of a node) an intranodal connection cost of interconnects coupling RPs within a node, and/or to an intranodal fabric, and/or overall routes between RPs via the interconnects and/or through the intranodal fabric. A TCC can retrieve connection costs of particular interconnects and/or interconnections among RPs, from, for example, a hardware description of a node. The connection costs can be costs pre-determined based on a design of the node, and/or components thereof, or can be previously computed costs. A TCC can obtain a hardware description from a database, or as an input of an API to the TCC.

Alternatively, or additionally, a TCC can compute connection costs of particular interconnects and/or interconnections among RPs based, for example, on communications metrics, such as previously described, associated with RP interconnection topologies within the node. A TCC can compute connection costs using a hardware description of the node, and/or components thereof, that can include performance and/or design characteristics of the interconnects and interconnection fabrics of the node corresponding to communications metrics.

To illustrate further, an RDS can allocate some or all of RPs 102 of node 100 to execute dataflow workers configured in a worker logical topology. Using, again, the example of AllReduce, a preferred logical topology of dataflow workers to execute the application can be a DPW ring. In a case in which only RPs of node 100 are allocated, TCC 110 can configure the allocated RPs to form a complete, intranodal ring of RPs, within node 100, corresponding to a dataflow workers configured in the DPW ring. TCC 110 can compute intranodal connection costs associated with routes between any pair of RPs of node 100 within node 100 and/or through fabric 106. The intranodal connection costs can comprise, or correspond to, for example, topological and/or performance characteristics of interconnects 108 that can couple the RPs to fabric 106 and/or to a route through fabric 106 between a pair of RPs.

Topological characteristics can comprise a hop count through switches of an intranodal fabric, such as 106, which can include a hop count corresponding to a direct (e.g., point-to-point) connection between two RPs. As shown in FIG. 1A, RPs 102E and 102F share interconnect 108H. Thus, it can be possible that interconnect 108H can permit a direct connection between RPs 102E and 102F, such that this connection of RPs 102E and 102F can have a hop count of 0. Performance characteristics of an interconnect, and/or intranodal fabric, such as interconnects 108 and/or fabric 106, can comprise performance characteristics such as previously described.

FIG. 1A further illustrates example connection costs, and corresponding configurations of RPs 102 through fabric 106, to form particular physical topologies of the RPs that can be used to configure dataflow workers executing on the RPs. Table 112A of FIG. 1A illustrates example connection costs comprising a hop count for routes among pairs of RPs 102. Connection costs, in Table 112A, are denoted as "RnXY", in which "Rn" refers to a possible route through fabric 106 between RPs X and Y among RPs 102. For example, "R1AB" denotes a route 1 between RP 102A and RP 102B through fabric 106. Routes between pairs of RPs among RPs 102, in Table 112A, are only illustrative and not meant to be exhaustive of all possible routes.

As can be seen in FIG. 1A, route R1AB can comprise interconnect 108A from RP 102A to switch 104A, switch 104A; and, interconnect 108B from switch 104A to RP 102B. Accordingly, in Table 112A, route R1AB has a connection cost (hop count) of "1". A route through fabric 106, R1AC coupling RP 102A and RP 102C, can comprise interconnect 108A from RP 102A to switch 104A; switch 104A; interconnect 108K coupling switch 104A to switch 104B; switch 102B; and, interconnect 108C from switch 104B to RP 102C. Accordingly, in Table 112A, route R1AC has a connection cost (hop count) of "2".

FIG. 1A. depicts RPs 102B and 102G both having connections to both switches 104A and 104B of fabric 106. Accordingly, while RPs 102A, 102E, and 102F each have a connection cost of "2", in Table 112A, to communicate with any of RPs 102C, 102D, 102G, and 102H, RP 102B can have a route through fabric 106 (via interconnect 108J to switch 104B) to any of RPs 102C, 102D, 102G, and 102H having a connection cost of "1", as shown in Table 112A. Table 112B in FIG. 1A illustrates example shortest hop ring routes between RPs 102 based on connection costs in Table 112A.

In implementations, RPs can share an interconnect interface (e.g., a PCI-E interface or link) and/or a network (e.g., Ethernet) interconnect (e.g., sharing an adapter, such as a network interface card of an Ethernet network). In FIG. 1A, RP 102F is shown sharing interconnect 108H with RP 102G. Sharing an interconnect can reduce communications performance between RPs utilizing the shared interconnect and other RPs. For example, in FIG. 1A RPs 102F and 102G sharing interconnect 108H can result in each of RPs 102F and 102G getting less than the full bandwidth of interconnect 108H, whereas RP 102G, for example, utilizing interconnect 108F can provide RP 102G with the full bandwidth of interconnect 108F.

Interconnect 108H is shown in FIG. 1A having an associated a hop count connection cost of "1" for RPs 102F and/or 102G to communicate through fabric 106 with any of RPs coupled to switch 104A. However, the connection cost of a route of RPs 102F and/or 102G, via interconnect 108H, can have an additional, or alternative cost, corresponding to communications performance characteristics associated with sharing the interconnect. For example, sharing an interconnect can add to communications latency for an RP sharing an interconnect, or can limit utilization (and, consequently, data throughput) of a shared interconnect, such as 108H. Thus, a TCC can compute, or associate, a performance-based connection cost with a particular interconnect of an RP to, and/or through, an interconnect fabric.

For example, while not shown in the example of Table 112A, a performance-based connection cost (as opposed to, or in combination with, a hop count) can have a cost of "1" for an unshared (exclusive) interconnect of RPs 102 to a switch of fabric 106. However, a connection cost for a shared interconnect, such as 108H in FIG. 1A, can have a higher connection cost—for example, "1.5"— owing to the reduced service (e.g., reduced bandwidth and/or increased latency) of the shared interconnect to RPs 102F and 102G when using that interconnect.

Based on the intranodal connection costs, such as shown in the examples of Table 112A, TCC 110 can configure RPs of node 100 in a connections-optimized intranodal ring topology to execute dataflow workers in a DPW ring. In a set of connection costs among pairs of RPs, such as in Table 112A, TCC 110 can sort the pairs based on their respective connection costs, such as from lowest to highest connection costs. TCC 110 can use such cost-sorted pairs of RPs, for example, to determine a connections-optimized configuration of the RPs that can be a lowest cost configuration to form the DPW ring.

For example, in FIG. 1A TCC 110 can allocate RPs 102A, 102B, and 102C to execute three dataflow workers—DPW1, DPW2, and DPW3—in a DPW ring. Based on connection costs between pairs of RPs among RPs 102A, 102B, and 102C, in Table 112A, shortest hop count routes between pairs of the RPs comprise RP 102A→102B having cost 1, 102B→102C having cost 1, and 102C→102A having cost 2. TCC 110 can configure RPs 102A, 102B, and 102C in an logical ring, to correspond to a DPW ring of workers DPW1, DPW2, and DPW3, with RP 102A as a first RP, interconnected to RP 102B, as a successor to RP 102A, via interconnect 108A and 108B, RP 102B, interconnected to RP 102C, as a successor to RP 102B, via interconnect 108J and 108C, and RP 102C interconnected to RP 102A, to complete the ring, via interconnect 108C to switch 104B, interconnect 108K between switches 104A and 104B, and interconnect 108A between switch 104A and RP 102A.

In a case in which an RDS allocates, for example, all of RPs 102 to execute dataflow workers in a DPW ring, TCC 110 can form connections-optimized intranodal rings comprising all of RPs 102. In Table 112B, RING 1 and RING 2 both have shortest hop counts among pairs of RPs 102, compared to alternative possible routes among pairs of RP among RPs 102 (based on the RPs each communicating with one input and one output RP) through fabric 106. For example, in RING1 RP 102A can connect to RP 102B, via R1AB, RP102A can connect to RP 102C, via R1BC, and so forth, to form a ring from RP 102A→102B→102C→102D→102H→102G→102F→102E, and back, from 102E, to 102A. The RDS can configure (e.g., a runtime component of the RDS, and/or a TCC) individual RPs, and/or groups of successive RPs, among RPs within RING 1 or RING 2 to execute the dataflow workers in the DPW ring. It should be noted that allocation of RPs to dataflow workers need not be limited to one to one. In the case that the number of dataflow workers does not, in total, exceed the number of RPs of a node available to execute the dataflow workers, an RDS can allocate a plurality of RPs to an individual dataflow worker.

While an application can require, and an RDS, can configure, a single complete logical topology (e.g., a complete ring) of RPs within node 100, this does not limit implementations. It would be apparent to one of ordinary skill in the art that an RDS can additionally form multiple instances of one or more logical topologies of RPs within a node (e.g., multiple logical rings of RPs). For example, in FIG. 1A, using RPs of node 100, an RDS can form a ring comprising, for example, RPs 102A, 102B, 102C, and 102D (e.g., to execute one set of dataflow workers) and can additionally form a second logical ring of RPs comprising, for example, RPs 102E, 102F, 102G, and 102H (e.g., to execute the same or another set of dataflow workers). A TCC can determine connections-optimized configurations of each of such set of RPs to form the multiple ring topologies.

As previously described, dataflow workers of an application can require more RPs than are included in a particular node (e.g., 16 RPs versus the 8 illustrated in node 100 of FIG. 1A), such that RPs of multiple nodes can be required to execute the application. Additionally, or alternatively, not all RPs of a particular node may be available at runtime of an application to execute the application. For example, some RPs of a node can be allocated to execute other applications (e.g., in an RDS that can concurrently execute multiple applications, such as in a partitioned RDS), leaving only a subset of RPs within that node available to execute dataflow workers of an application and requiring allocation of RPs in one or more other nodes to execute the dataflow workers. As previously described, in such cases, RPs of a particular node can form an intranodal segment of the overall RPs required to execute the workers and can interconnect the intranodal segments to form an internodal segment of an internodal interconnection topology of RPs, and/or a complete internodal interconnection topology of RPs. Hereinafter, for brevity, "segments", used alone, refers to intranodal segments interconnected within a node, while "internodal segment" and "internodal interconnection topology" refer, hereinafter, to segments of RPs spanning multiple nodes (e.g., internodal segments, and/or internodal interconnection topologies, comprising intranodal segments of multiple nodes).

A TCC can determine a connections-optimized configuration of segments of differing nodes to form a complete internodal RP interconnection topology (e.g., a complete RP ring spanning multiple nodes of an RDS) that can execute dataflow workers in a particular worker logical topology. An internodal connections-optimized configuration of RPs of multiple nodes can comprise an interconnection topology of two or more segments of RPs interconnected via intranodal fabrics within the nodes. A TCC can determine an internodal connections-optimized configuration based on a lowest cost interconnection of the segments.

While the examples of FIGS. 1A and 1B illustrate internodal segments comprising a plurality of RPs, this is only for purposes of illustrating the disclosure and not intended to limit implementations. It would be apparent to one of ordinary skill in the art that a segment of a node can comprise a single processing element of the node (e.g., a single RP, or a single processing element of an RP, such as a single tile or single PCU in the example RPs of Grohoski and Kumar). In such a case, the head and tail RP of a segment can be the same RP, and the RP can be interconnected, in an internodal interconnections topology of segments, to a head or tail RP of one or more other segments.

A complete RP interconnection topology, formed of interconnected segments of multiple nodes, can comprise an interconnection of a tail RP (or, set of RPs) of one segment to a head RP (or set of RPs) of another segment. A complete multi-node ring topology can comprise an interconnection of a tail RP of a last successor segment, among segments interconnected as a pipeline, to a first RP of a first predecessor segment of the pipeline. A connections-optimized configuration of a ring of RPs can interconnect all of the segments to form the ring based on a lowest cost interconnection of all of the segments.

In such multi-node configurations, alternative communications routes among the RPs through an internodal fabric interconnecting the multiple RPs (and/or nodes including the RPs) can have widely differing performance characteristics. The differing performance characteristics of the alternative routes can correspond to particular interconnects among the nodes and internodal fabrics, node interconnection topologies (i.e., interconnection topologies of the RDS interconnection nodes), and locality of particular nodes and/or fabric elements within the node interconnection topologies. Consequently, an interconnection topology of the RDUs can have widely varying impacts on dataflow worker performance executing an application.

For example, performance characteristics of an internodal fabric can comprise network bandwidth and/or throughput through the fabric, latency through the fabric, and/or utilization of the fabric (which can, in turn, affect throughput and/or latency through the fabric). Network bandwidth through an internodal fabric can be different between different pairs of nodes, and/or can vary by the type and performance of a particular interconnect coupling a node and an internodal fabric, and can vary by locality of the node (and/or locality of RPs within a node) and/or fabric in an RDS interconnect topology interconnecting nodes of the RDS.

Thus, it can be especially important in an RDS to determine a connections-optimized RP configuration allocated across multiple nodes to dataflow workers. In implementations a TCC can determine an intranodal connections-optimized RP configuration—e.g., a connections-optimized intranodal segment of the overall RP interconnection topology—within each of the nodes that comprise RPs allocated to the dataflow workers. The TCC can then determine an internodal connections-optimized interconnection of the segments to form a complete, connections-optimized configuration of all of the RPs within an RP interconnection topology corresponding to a worker logical topology.

FIG. 1B illustrates example RDS 114 comprising multiple nodes each having a connections-optimized intranodal segment of a multi-node RP interconnection topology. In FIG. 1B, RDS 114 is shown comprising nodes 120A, 120B, 120C, and 120D (collectively, "nodes 120") and TCC 116. Nodes 120 are shown, in FIG. 1B, interconnected via intranodal fabrics 124A and 124B (collectively "fabrics 124"). Nodes 120A, 120B, 120C, and 120D are shown, in FIG. 1B, interconnected to intranodal fabric 124A (hereinafter, for brevity, "fabric 124A") via respective interconnects 126A, 126B, 126C, and 126D (collectively, "interconnects 126"). Nodes 120A, 120B, 120C, and 120D are shown interconnected to intranodal fabric 124B (hereinafter, for brevity, "fabric 124B") via respective interconnects 128A, 128B, 128C, and 128D (collectively, "interconnects 128"). Fabric 124A can serve to couple interconnects among interconnects 126 and fabric 124B can serve to couple interconnects among interconnects 128.

In implementations, fabrics 124A and 124B can be the same type of fabric, such as a fabric comprised of a network of I/O buses (e.g., interconnected PCI buses) and/or links (e.g., interconnected PCI-E or IB links), or a network of network communications links (e.g., an Ethernet comprising Ethernet links). Internal networks 118A and/or 118B can comprise, for example, one or more switches or I/O bus bridges to interconnect links among interconnects 126 and 128, respectively.

While fabrics 124A and 124B can be the same type, such as in these examples, based on internal design characteristics, for example, of each of fabrics 124A and 124B can have differing connection costs (e.g., hop count and/or performance-based connection costs). Alternatively, fabrics 124A and 124 B can be differing fabrics, such as fabric 124A comprising I/O buses and/or links and fabric 124B comprising network communications links. Thus, interconnects 126 can have differing communications (e.g., data transfer) performance than interconnects 128, and routes through fabrics 124A and 124B can have differing topological (e.g., hop count) and/or performance characteristics.

Communications routes between RPs among nodes 120, through fabrics 124A and 124B, can have different connection costs (e.g., performance-based connection costs) based, for example, on physical locality of each of fabrics 124A and 124B and/or, based on physical lengths of interconnects 126 and/or 128 corresponding to localities of fabrics 124A and/or 124B. Communications routes between nodes (and, RPs of nodes) among nodes 120, through fabrics 124A and 124B, can have different connection costs based on the design or implementation of individual interconnects (e.g., having greater or lesser bandwidth or shared utilizations) among interconnects 126 and/or 128.

RPs among each of nodes 120 can be allocated to execute dataflow workers of an application. Continuing the example of an RP ring to execute an AllReduce algorithm, dataflow workers executing on RPs included in two or more of nodes 120 can form a DPW ring to perform AllReduce operations. As shown in FIG. 1B, each of nodes 120 comprises an intranodal segment of an RP logical ring that can be combined with intranodal segments of other nodes among nodes 120 to form a complete logical ring of RPs corresponding to a DPW ring of dataflow workers.

In the example of FIG. 1B, nodes 120 are shown including respective segments 122A, 122B, 122C, and 122D (collectively, "segments 122") comprising RPs of the respective nodes. In FIG. 1B, segment 122A of node 120A is shown having head (first predecessor) RP 130A and tail (last successor) RP 130B; segment 122B of node 120B is shown comprising segment 122B, having head RP 132A and tail RP 132B, segment 122C of node 120C is shown comprising segment 122C, having head RP 134A and tail RP 134B, and segment 122D of node 120C is shown comprising segment 122D, having head RP 136A and tail RP 136B. In FIG. 1B, nodes 120 are not explicitly shown comprising RDUs. However, in implementations nodes among nodes 120 can include RDUs that further include RPs among RPs such as RP 130A and/or RP 130B, 132A and/or 132B, 134A and/or 134B, and 136A and/or 136B.

Each of segments 122A, 122B, 122C, and 122D can comprise connections-optimized segments of RPs within respective nodes 120A, 120B, 120C, and 120D. TCC 116 can be a TCC such as previously described and can have determined, and/or computed intranodal RP connection costs associated with the interconnections and/or interconnection topologies of RPs within each of the respective nodes among nodes 120, similar to the example of FIG. 1A. Based on connection costs associated with intranodal communications routes among RPs within a node, similar to the manner previously described with reference to FIG. 1A, TCC 116 can have determined a connections-optimized RP configuration to form each of segments 122.

TCC 116 can determine a connections-optimized configuration of segments 122 to form a complete logical topology of RPs (i.e., a complete logical topology corresponding to a worker logical topology, such as a DPW ring) in a manner similar to that previously described to form an intranodal ring of RPs within a node. For example, TCC 116 can compute internodal connection costs associated with interconnects 126 and/or 128 and/or communications routes through fabrics 124A and/or 124B. Based on the internodal connection costs, such as connection costs corresponding to connections between a last successor RP of one segment and a first predecessor RP of another segment, among a pair of segments among segments 122, TCC 116 can determine a connectivity configuration of the segments that forms a connections-optimized completely interconnected ring of all RPs allocated, among nodes 120, to execute the dataflow workers.

To illustrate possible connection costs of alternative communications routes between pairs of segments among segments 122, in FIG. 1B fabric 124A is shown comprising direct connections of interconnects 126A and 126B and of interconnect 126C and 126D, bypassing internal network 118A through fabric 124A. Similarly, in FIG. 1B fabric 124A is shown comprising direct connections of interconnects 126C and 126D, bypassing internal network 118B through fabric 124B. Via routes utilizing the direct connections, pairs of segments 122A and 122B, and 122C and 122D, can have a connection cost, for example, of "1".

However, interconnects 126A and 126B pass through internal network 118A to connect to interconnects 126C and/or 126D, and vice versa. Thus, connections among pairs of segments 122A or 122B with segments 122C or 122D, via fabric 124A, can have respective connection costs of "2", owing to the added connection cost of internal network 118A. Similarly, in fabric 124B, interconnects 128A and 128B pass through fabric 124B such that connections among pairs of segments 122A or 122B with segments 122C or 122D, via fabric 124B, can have, for example, respective connection costs of "2", owing to the added connection cost of internal network 118A.

Fabric 124A of fabric 124B can have an internal topology differing from that of fabric 124A, such as more or fewer switches or I/O bridges, or a different organization of switches and/or bridges. Links among interconnects 128 can have differing performance characteristics, such as higher or lower bandwidths, data rates, and/or latencies. Thus, routes passing through fabric 124A, and/or using links among interconnects 126, can have differing performance than routes passing through fabric 124B and/or using links among interconnects 128. Thus, alternative interconnections of pairs of segments among segments 122 can have higher or lower connection costs that correspond to such differences.

Additionally, utilization of an interconnection, internal network of a fabric, and/or a fabric as a whole, can vary between the links and/or fabrics. For example, as can be seen in FIG. 1B, interconnects 126C and 126D share an internal connection to fabric 124A. In contrast, in fabric 124B interconnects 128C and 128D are independently (e.g., utilizing a respective, unshared connection) to fabric 124B. Thus, depending on the dynamic utilization of interconnects 126C and 126D through fabric 124A, the utilization of the shared connection of interconnects 126C and 126D to fabric 124A can increase or decrease bandwidth available to interconnections of segments 122A and 122B through fabric 124A. Similarly, depending on the dynamic utilization of fabric 124A, the utilization of fabric 124A can increase or decrease bandwidth available to interconnections of segments 122A and 122B through fabric 124A.

Dynamic utilization of shared interconnections, and/or of intranodal and/or internodal fabrics (and/or components thereof, such as internal networks 118A and 118B) can therefore create dynamically differing connections costs and associated connections-optimized configurations of segments 122 to form a complete RP interconnection topology corresponding to a dataflow worker logical topology. In such cases, it can be advantageous for a TCC to compute, at runtime of an application (e.g., a time of executing dataflow workers of the application) or at the time RPs are allocated to dataflow workers, dynamic connections costs.

To compute connection costs, including dynamic connection costs, associated with the interconnects and fabrics of RDS 114, TCC 116 can, for example, extract (e.g., from an RDS hardware description) the interconnection topologies of RDS 114, fabrics 124, internal networks of fabrics 124, nodes 120, and/or intranodal fabrics internal to nodes among nodes 120. TCC 116 can, for example, extract performance characteristics of interconnects 126 and/or 128, fabrics 124, internal networks of fabrics 124, nodes 120, and/or intranodal fabrics internal to nodes among nodes 120. Additionally, or alternatively, TCC 116 can receive such topological and/or performance information from an application and/or other components RDS 114, such as, for example, RDS configuration files, application execution files, an application compiler, a software library of, or associated with, RDS 114, and/or a runtime processor of RDS 114.

Based on the topological and/or performance information extracted and/or received, TCC 116 can compute connection costs corresponding to routes between segments in differing nodes. Using the connection costs, TCC 116 can determine a connections-optimized interconnection (e.g., lowest aggregate connection-cost) of segments 122 to form a complete RP interconnection topology to execute dataflow workers utilizing the RPs of segments 122.

Table 140 of FIG. 1B illustrates (using the same route name nomenclature as Tables 112A and 112B in FIG. 1A) example connection costs for communications routes using interconnects 126 through fabric 124A. TCC 116 can use the connection costs to then determine connections-optimized configurations of segments of nodes 120 (i.e., the RPs included in segments 122) through fabrics 124. To facilitate selecting a connections-optimized configuration of segments among the alternative segment communications routes, TCC 110 can sort the routes based on connection costs. Table 142 of FIG. 1B illustrates an example of routes of Table 140 sorted by connection costs. A TCC can, in the case of internodal RP topologies, further sort the routes having the same connection costs based, for example, on an identity of a node. Table 144 in FIG. 1B illustrates an example of routes sorted in Table 142, based on connection costs in Table 140, further sorted, among those having the same connection costs (e.g., routes having a cost of 1 in Table 142 sorted among these by node ID, and routes having a cost of 2 in Table 142 sorted among these by node ID). While FIG. 1B illustrates example cost-sorted communication routes among segments 122, a TCC can similarly compute cost-sorted communication routes among RPs within a node, to form complete logical RP topologies and/or intranodal segments of a complete worker logical topology.

In implementations, a TCC can extract/receive interconnect and/or interconnection topology and/or performance information, and compute corresponding connection costs, as a function of, for example, booting or initializing an RDS. In such a case, barring any physical changes to those topologies and/or interconnects, the TCC can analyze the topologies and interconnects, and compute the connection costs, only once, and can store the computed costs to use in determining connection-optimized arrangements of RPs and/or intranodal segments when configuring the nodes/RPs to execute the application.

Alternatively, a TCC can extract/receive interconnect and/or interconnection topology and/or performance information, and compute corresponding connection costs, as a function of, and/or during, executing an application (e.g., at application runtime). A TCC can receive (e.g., from a runtime processor or component thereof) a set of RPs (which can include, or imply, associated nodes) of an RDS allocated, and a logical topology of the RPs, to execute dataflow workers of an application. Using the connection costs, can compute a connections-optimized configuration of the RPs to form highest performance communications routes among the RPs and dataflow workers within the logical topology.

In implementations, RPs designated or allocated to execute dataflow workers can be virtual RPs corresponding to physical RPs of an RDS. For example, in virtualized RDS, and/or a cloud computing system ("the cloud") comprising a physical RDS, RPs forming a logical topology can be virtual RPs corresponding to physical RPS of the RDS. At runtime of an application (to execute the dataflow workers), the virtualized RDS and/or cloud (e.g., a runtime processor of an RDS or cloud) can allocate particular physical resources corresponding to virtual RPs requested or allocated to execute the application. At runtime, the RDS can allocate particular physical RPs to the virtual RPs based on availability and/or topological locations of the RPs within the RDS. A TCC can compute alternative connections-optimized configurations of physical RPs, available at runtime, or in a particular configuration of the RDS, to form a worker logical topology, and the RDS can allocate the physical RPs based on the connections-optimized RP configuration. Alternatively, and/or additionally, the TCC can select physical RPs from those available at runtime, or in a particular configuration of the RDS, to execute dataflow workers, based on connections-optimized RP configurations to execute dataflow workers in the worker logical topology.

Figure 2:
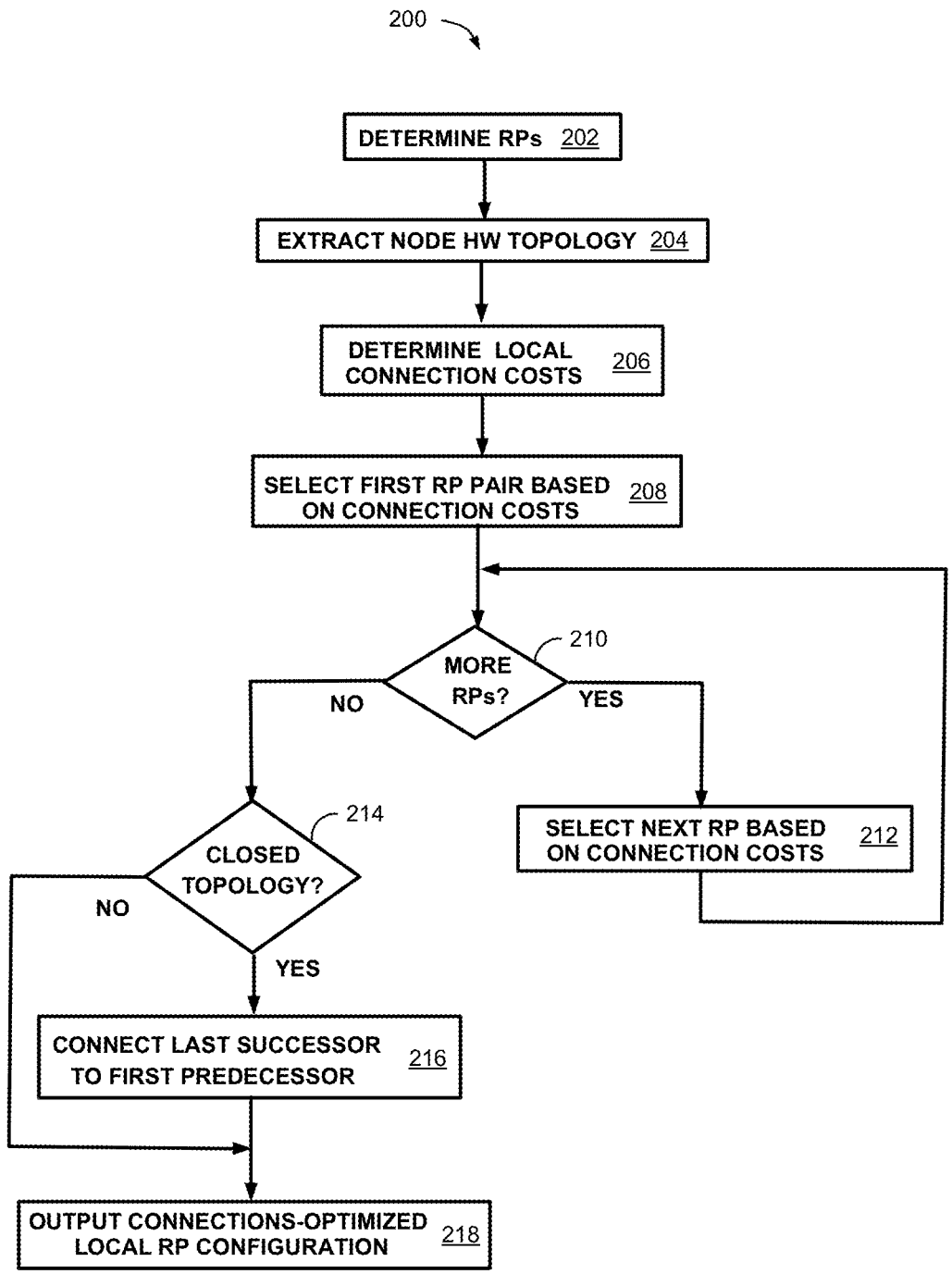
FIG. 2 illustrates an example method for forming an intranodal interconnection topology of reconfigurable processors, according to aspects of the disclosure.
Figure 3:
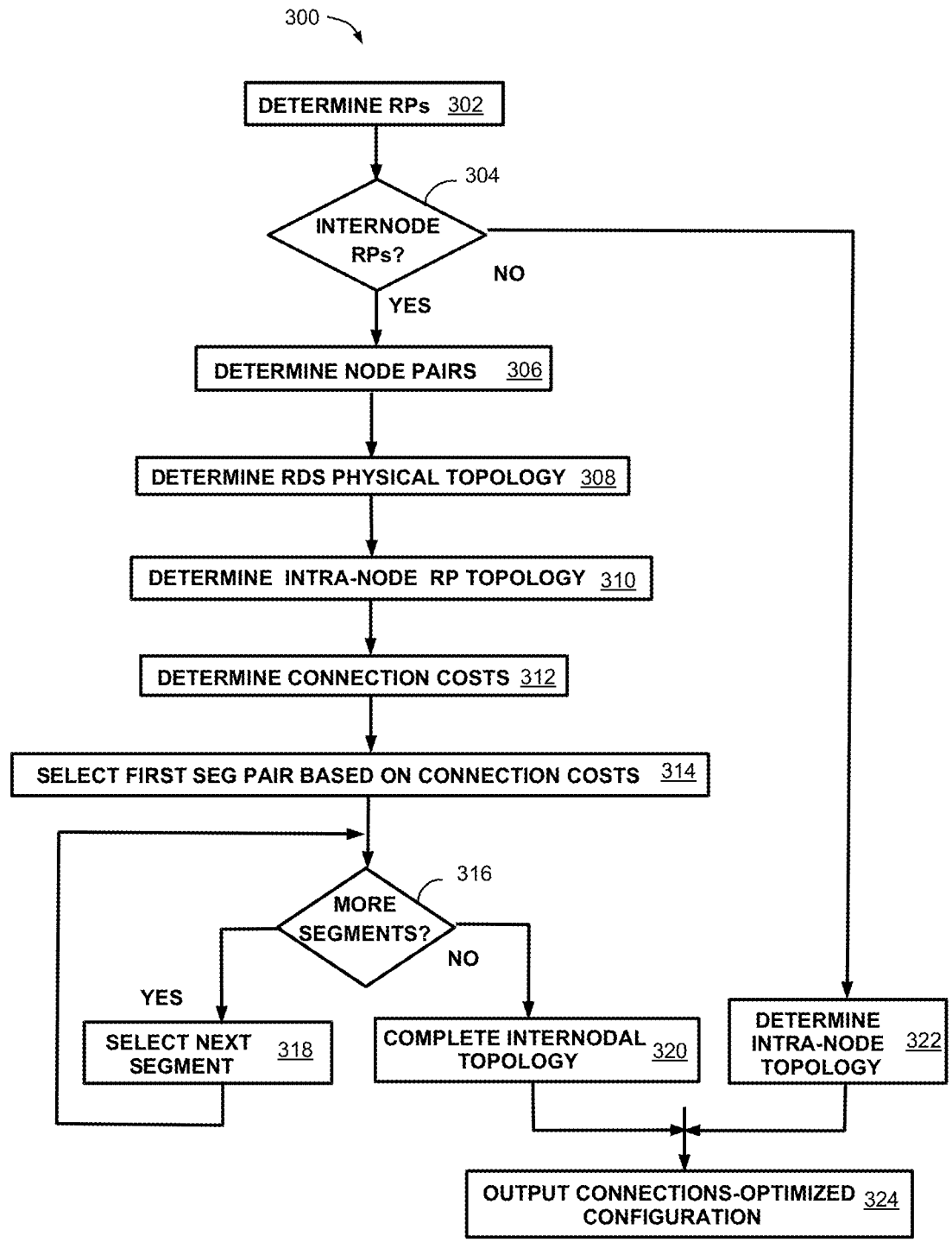
FIG. 3 illustrates an example method for forming an internodal interconnection topology of reconfigurable processors, according to aspects of the disclosure.

In implementations, a TCC can perform methods, and/or operations of methods, to determine physical interconnects and RP interconnection topologies in an RDS; to compute associated connection costs; and/or to determine a connections-optimized RP configuration corresponding to a worker logical topology. FIGS. 2 and 3 illustrate examples of such methods. For purposes only of illustrating the disclosure, but not intended to limit implementations, the example methods of FIGS. 2 and 3 are described as performed by TCC of an RDS system comprising nodes and RPs such as node 100 in FIG. 1A and nodes 120 FIG. 1B. Also, for purposes only of illustrating the disclosure, but not intended to limit implementations, the TCC is considered to be a component of the RDS, such as a runtime processor of an RDS, or component thereof, as illustrated in Kumar. The methods are further described in the context of a logical topology of dataflow workers comprising a DPW ring, such as previously described to execute an AllReduce algorithm.

However, it would be apparent to one of ordinary skill in the art that, in alternative implementations, the methods can apply to computing systems other than dataflow computing systems, and/or to dataflow computing systems comprising processors other than nodes and RPs as described herein, and/or in configurations other than as illustrated in the examples of FIGS. 1A and 1B. It would be apparent to one of ordinary skill in the art that, in implementations a TCC can be a component of an RDS other than a runtime processor, or can be a component of, for example, a computing system communicatively coupled to an RDS. As previously described, the methods can also apply to logical worker topologies, and/or RP interconnection topologies, other than a ring (e.g., a tree or mesh).

FIG. 2 illustrates example method 200 to form an intranodal RP ring to execute dataflow workers in a DPW ring or, alternatively, a segment of an internodal RP ring, within a node (hereinafter, with reference to method 200, "the node") of an RDS (hereinafter, with reference to method 200, 'the RDS"). For only purposes of illustrating the example of method 200, but not intended to limit implementations, the method is described as performed by a TCC of the RDS (hereinafter, with reference to method 200, "the TCC").

In operation 202 of method 200 the TCC determines RPs of the node allocated to execute dataflow workers a worker logical topology, such as a DPW ring. In implementations, in operation 202 the TCC can determine the RPs, and/or an RP interconnection topology corresponding to the worker logical topology, based on, for example, an output of an application compiler, or runtime component, of an RDS. In another example, in operation 202 the TCC can determine the RPs, and/or a worker logical topology, based on an input to an API of the TCC. The RPs can be RPs allocated by the RDS (e.g., a runtime processor of the RDS) to execute the dataflow workers, or can be RPs to allocate based on, for example, connections-optimized configurations of RPs of the RDS available to execute the dataflow workers.

In operation 202 the TCC can further determine that the RPs form a complete DPW ring or, alternatively, that the RPs are to form a segment of a multi-nodal RP ring. The TCC can determine that the RPs of the node form a complete ring, or a segment based, for example, on an input to method 200.

In operation 204, the TCC extracts connection topology information about the RP connection topologies to interconnect the RPs within the node. The connection topology information can include information describing interconnects of the node and/or RPs (e.g., I/O links and/or switching networks) to interconnect the RPs; information describing an intranodal interconnection fabric; an RP interconnection topology; and/or information describing performance characteristics (e.g., bandwidths, data rates, data transfer latencies, interconnection lengths, fabric internal hops, utilizations, etc.) of the interconnects, intranodal fabric(s), and/or RP interconnection topology. The connection topology information can be textual and/or graphical, to describe the node and/or RP hardware and RP interconnection topologies.

In operation 204, the TCC can extract the connection topology information from, for example, a hardware description of the node hardware interconnection topology, and associated interconnects, interconnecting the RPs within the node. In operation 204, the TCC can retrieve the hardware description from, for example, a configuration file of the RDS, or a database of the RDS. The TCC can, additionally or alternatively, receive the hardware description as an input of an API of the TCC, or as metadata associated with the application or configuring the RDS to execute the application.

In operation 206, based on the connection topology information, the TCC determines RP connection costs of communications routes, via RP interconnection topologies internal to the node, between RPs of the node. As previously described, the RP connection costs, determined in operation 206, can be based on, or correspond, to communications optimization metrics, and/or design attributes of interconnection interfaces and/or fabrics.

Communications optimization metrics can include, for example, a fewest number of switches (hops) intervening between nodes, and/or RPs of nodes, in a physical interconnection topology; a lowest utilized interconnection interface and/or fabric; a highest bandwidth interconnection interface; and/or whether an interconnection interface or fabric is a shared among multiple nodes, and/or RPs of nodes. Design attributes of interconnection interfaces and/or fabrics can comprise a bandwidth of an interconnection interface, a bandwidth and/or data rate of an interconnection fabric and/or switches/buses of a fabric, a physical length (e.g., a wire or cable length) of an interconnection interface and/or a physical route through an interconnection fabric, a physical locality of an interconnection interface and/or fabric within a physical interconnection topology of an RDS, and/or a data width (e.g., number of bits or bytes) of an interconnect interface, for example.

In operation 206, the TCC can determine connection costs associated, for example, with communications routes between each pair of RPs of the node (or, alternatively, of only RPs of the node forming an intranodal ring or segment of an internodal ring). In operation 206, the TCC can determine the connection costs based on previously computed connection costs (e.g., computed at application compile time, RDS boot or initialization time, or computed as a design attribute of the node and stored for later use by programs of the RDS).

Additionally, and optionally, in operation 206 the TCC can sort communications routes between RPs, within the node, based on the connection costs. For example, with reference again to FIG. 1A, in operation 206 the TCC can sort communications costs of RP communications routes such as Table 112A, sorting all communications routes having a cost of "1" into one group and all communications routes having cost of "2" into another group.

Based on the connection costs, in operation 208 the TCC selects a first pair of the RPs determined in operation 202 to form an initial, segment of a "complete" intranodal topology such a complete intranodal ring or a complete segment of a multi-nodal ring. The TCC selects one RP of the pair to be a starting RP and a first successor RP in the intranodal ring or segment to interconnect via a lowest cost (among the RP connection costs) communications route between the intranodal RPs. In operation 208, the TCC can select a starting and first successor RP based on a lowest cost of a communications route between the starting and first successor RPs and/or, optionally, based on a connection cost associated with the successor RP to other RPs forming the complete intranodal topology. A lowest connection cost communications route between the pairs of RPs can comprise a route between the RPs having a lowest connection cost among the RP connection costs determined in operation 206. The TCC can determine such a lowest cost connection route, and the first pair of RPs, using, for example, a cost-based sort of the RP connections costs such as illustrated in Tables 112A of FIG. 1A.

In operation 210, the TCC determines if the RPs included in the segment formed in operation 208 (the "current segment") comprise all RPs included in the complete intranodal topology. If, in operation 210, the TCC determines that the RPs included in the current segment do not comprise all RPs in the complete intranodal topology, in operation 212 the TCC selects a next successor RP to interconnect to the current successor RP, forming the last successor of the current segment. In operation 212, the TCC can select the next successor RP based on a connection cost of a communications route between the current successor and a candidate next successor RP and/or, optionally, based on a connection cost of a communications route between the candidate next successor and other RPs of the complete intranodal topology not yet included in the complete intranodal topology. The TCC repeats operation 210 to determine if there additional RPs, among those determined in operation 202, to connect to the last successor selected in operation 212 and form a complete intranodal topology.

For example, in a DPW ring, the last successor RP of a segment comprising all RPs of the complete intranodal topology can connect to the starting RP of the segment to form a complete a ring of the RPs. However, a feedback path, from a successor to predecessor RP, is not limited to ring topologies, and RPs of other topologies (e.g., trees of RPs, or meshes of RPs, such as in a convolutional neural network) can include feedback paths from one or more successor RPs to one or more predecessor RPs in a complete intranodal topology. Such a feedback path can form, for example, another ring topology of a set of RPs within the totality of RPs determined in operation 202. Thus, a "closed topology" of a complete intranodal topology can comprise a feedback path (or, paths) through the intranodal fabric between successor and predecessor RPs of the node.

If the TCC determines, in operation 210, that the RPs included in the current segment comprise all RPs in the complete intranodal topology, in operation 214 the TCC determines if the complete intranodal topology comprises a "closed topology", such as a complete intranodal ring or completed feedback paths. If so, in operation 216 the TCC determines a communications route to couple the successor and predecessor RPs of a ring or feedback path(s), through the intranodal fabric, that then form a closed topology of RPs. In operation 216, the TCC can determine a communications route between successor and predecessor RPs based on communications costs of interconnections among them, similar to the manner of choosing a successor RP in operation 212.

If, in operation 214 the TCC determines that the complete intranodal topology is not a closed topology or, having determined RP communications paths that couple successors and predecessors in a closed topology, in operation 218 the TCC outputs a connections-optimized configuration of the RPs forming a complete intranodal RP interconnection topology.

In operation 218 the TCC can output the results to, for example, a runtime component of the RDS that can configure the RDS to interconnect the RPs in the connections-optimized configuration output in operation 218. Alternatively, or additionally, in operation 218 the TCC can output the results to a storage device or medium, and the RDS can apply the stored connections-optimized configuration to configure the RPs, determined or received by the TCC in operation 202, to execute the application.

FIG. 3 illustrates example method 300 for determining connections-optimized configurations of RPs among multiple nodes of the same and/or different nodes. Similar to the description of method 200 in FIG. 2, for only purposes of illustrating the example of method 300, but not intended to limit implementations, the method is described as performed by a TCC of the RDS (hereinafter, with reference to method 300, "the TCC"). However, as also similar to method 200, it would be apparent to one of ordinary skill in the art that method 300, or operations thereof, can be performed by a component of an RDS other than a TCC, or other than a TCC as particularly described herein.

Further similar to the description of method 200, the example of method 300 is described with reference to forming a logical ring of RPs to execute dataflow workers of a DPW ring. However, this is also for only purposes of illustrating the method and not intended to limit implementations. It would be apparent to one of ordinary skill to modify method 300, and/or operations of method 300, to apply the method to worker and/or RP physical and/or logical topologies other than ring topologies.

In operation 302 of method 300, the TCC determines RPs to interconnect to execute dataflow workers in a worker logical topology, such as a DPW ring. Similar to the example of method 200, in FIG. 2, in implementations in operation 302 the TCC can determine the RPs, and/or an RP interconnection topology corresponding to the worker logical topology, based on, for example, an output of an application compiler and/or runtime component, of an RDS, and/or based on an input to an applications programming interface (API) of the TCC. The RPs can be RPs allocated by the RDS (e.g., a runtime processor of the RDS) to execute the application or portions thereof.

In operation 304 the TCC determines if the RPs determined in operation 302 comprise RPs of multiple nodes, such that the RPs of individual nodes form intranodal segments of the overall DPW ring topology. The TCC can determine, in operation 304, that the RPs comprise RPs of multiple nodes based, for example, on an output of an application compiler and/or runtime component of an RDS, and/or based on an input to an applications programming interface (API) of the TCC, indicating nodal affinity of the RPs. The TCC can determine, in operation 304, that the RPs comprise RPs of multiple nodes based on a hardware description of the RDS.

If, in operation 304, the TCC determines that the RPs do not comprise RPs of multiple nodes, in operation 322 the TCC determines the node that includes the RPs determined in operation 302 and determines an intranodal connections-optimized configuration of the RPs within the node, such as illustrated by the example of FIG. 1A. In operation 322 the TCC can perform a method, such as example method 200 of FIG. 2, to determine an intranodal connections-optimized configuration of the RPs. In operation 324, the TCC outputs the intranodal connections-optimized configuration of the RPs resulting from operation 322. In operation 324 the TCC can output the intranodal connections-optimized configuration results to, for example, a runtime component of the RDS that can configure the RDS to interconnect the RPs in the connections-optimized configuration output in operation 324. Alternatively, or additionally, in operation 324 the TCC can output the results to a storage device or medium, and the RDS can apply the stored connections-optimized configuration to configure the RPs, determined or received by the TCC in operation 302, to execute the application.

If, on the other hand, the TCC determines in operation 304 that the RPs determined in operation 302 comprise RPs of multiple nodes, in operation 306, the TCC determines unique pairs of nodes comprising the RPs determined in operation 302 (that is, a subset of nodes of the RDS, determined in operation 302, to execute the workers).

In operation 308 the TCC further determines physical interconnection information associated with the pairs of nodes and, optionally, associated with pairs of RPs within the nodes. The physical interconnection information can include, for example, information describing interconnection interfaces and/or interconnection fabrics interconnecting the nodes, and/or RPs of the nodes among the pairs of nodes. The physical interconnection information can include, for example, physical interconnection topologies of alternative communications routes between nodes among the pairs of nodes, and/or performance characteristics (e.g., bandwidths, data rates, data transfer latencies, interconnection lengths, fabric internal hops, utilizations, etc.) of interconnection interfaces and/or interconnection topologies interconnecting each of the pairs of nodes.

In operation 308 the TCC can determine the physical interconnection information from a hardware description of the RDS, for example. In operation 308, the TCC can retrieve the hardware description from, for example, a configuration file of the RDS, or a database of the RDS. The TCC can, additionally or alternatively, receive the hardware description as an input of an API of the TCC, and/or as metadata associated with the application and/or dataflow workers or with configuring dataflow processors (e.g., RPs) of the RDS to execute the application (e.g., to execute the dataflow workers).

In operation the TCC 310 determines a connections-optimized intranodal segment of RPs of nodes among the node pairs determined in operation 306. The intranodal segment can comprise an intranodal segment such as illustrated by segments 122 in FIG. 1B. The TCC can determine the connections-optimized intranodal segments based on connection costs of intranodal physical interconnections of RPs within a node. The TCC can, for example, use method 200 of FIG. 2, or a method similar or equivalent to method 200 of FIG. 2, to determine the connections-optimized intranodal segments.

In operation 312, the TCC determines node connection costs associated with communications routes, through the RDS physical interconnection topology, to connect pairs of intranodal segments among the nodes. The intranodal segments can comprise segments within the same node and/or segments of differing nodes, among the node pairs. Similar to operation 206 of method 200, the node connection costs can be determined, in operation 312, based on, or corresponding, to communications optimization metrics, such as described in reference to operation 206 of method 200 in FIG. 2. In operation 312, the TCC can determine the node connection costs associated, for example, with communications routes between each pair of segments among the node pairs.

In operation 312, the TCC can determine the node connection costs based, for example, on a hardware description of the node interconnection topology, or based on previously computed connection costs (e.g., computed at application compile time, RDS boot or initialization time, or computed as a design attribute of the RDS and/or nodes, and stored for later use by programs of the RDS). In operation 312, the TCC can compute the node connection costs based on the physical interconnection information utilized in operation 308. As previously described, node interconnection and/or internode fabric utilizations can vary dynamically such that, in operation 312, it can be advantageous for the TCC to compute the node connection costs based on such dynamic variations. Additionally, and optionally, in operation 312 the TCC can sort communications routes between nodes based on the node connection costs and, optionally, node IDs, such as illustrated in tables 142 and 144 of FIG. 1B.

In operation 312, the TCC can, further, determine an order of pairs of nodes, among the pairs of nodes determined in operation 306, based on connection costs determined in operation 312. In operation 312 the TCC can sort the pairs of nodes based on connection costs between each of the pairs of nodes. The TCC can, in operation 312, further sort pairs of nodes having the same connection costs based, for example, on an identity of a node, and/or an identity of a dataflow processor of a node (e.g., an identity of an RDU of a node, or an RP of an RDU). For example, the TCC can, in operation 312, generate a list of pairs of nodes and can sort the list based first on connection costs of each of the pairs of nodes and, optionally, further based on an alphabetic order of host ids of host processors comprising dataflow processors, and/or interconnection interfaces and/or fabrics, included in the respective nodes.

In operation 314, based on the node connection costs determined in operation 312, the TCC selects a first pair of segments, among the multiple segments comprising the RPs determined in operation 302, to form a partially complete interconnection of the totality of the RPs determined in operation 302. The TCC selects one segment of the pair to be a starting segment and a first successor segment to interconnect via a lowest cost communications route between the pair of segments. A lowest connection cost communications route between the pairs of segments can comprise a route between the pair of segments having a lowest connection cost among the node connection costs determined in operation 312. The TCC can determine such a lowest cost communications route using, for example, a sorted list of pairs of nodes such as described in operation 312, using connections costs such as illustrated in tables 142 and 144 of FIG. 1B.

In operation 316 the TCC determines if there are additional segments to interconnect to the segments, and segment communications routes, selected in operation 314, to form a complete internodal topology of the RPs determined in operation 302. If, in operation 316, the TCC determines that there are more segments to connect to form a complete internodal topology, in operation 318 the TCC selects a next successor segment to interconnect to the partially complete interconnection of segments (e.g., the partial segment formed of the first segment pair selected in operation 314) and form a longer partially complete interconnection of segments.

In operation 318, the TCC can select the next successor segment, based on a lowest cost communications route between the last successor segment (e.g., between the last successor RP of the last successor segment) of the partially completed interconnection and the next successor segment. In operation 318 the TCC can select the next successor, base on the node connection costs, in a manner similar to that of operation 314 to select the first pair of segments. The TCC can repeat operations 316 and 318 until the TCC has determined an interconnection topology of the segments that comprises lowest cost communications routes among all RPs of a complete RP interconnection topology.

If, in operation 316, the TCC determines that there are no more segments to connect, in operation 320 the TCC completes connecting the segments to form the complete internodal topology determined in operation 302. In the example of a completed internodal ring topology of the RPs, in operation 320 the TCC can determine a communications route from the last successor segment selected in operation 318 to the starting segment selected in operation 314. In operation 320 the TCC can determine the lowest cost communications route between the last successor segment and the starting segment, based on the node connections cost, similar to the manner of selecting the first segment pair in operation 314 (and/or the manner of selecting the next successor segment in operation 318). In operation 324, the TCC outputs the resulting connections-optimized configuration of the RPs determined in operation 302.

Similar to RPs within a node having a feedback path between RPs, segments of an internodal RP topology can have feedback paths from a successor segment to a predecessor segment, among the totality of intranodal segments of the complete RP interconnection topology required in operation 302. Such a feedback path among segments can form, for example, another ring topology among a set of segments within the totality of segments of the complete RP interconnection topology. Operation 320 can include the TCC determining lowest cost communications routes to form feedback paths between particular segments of a larger RP interconnection topology, and the TCC can do so based on the node connections costs as described for operations 314 and 318.

Figure 4:
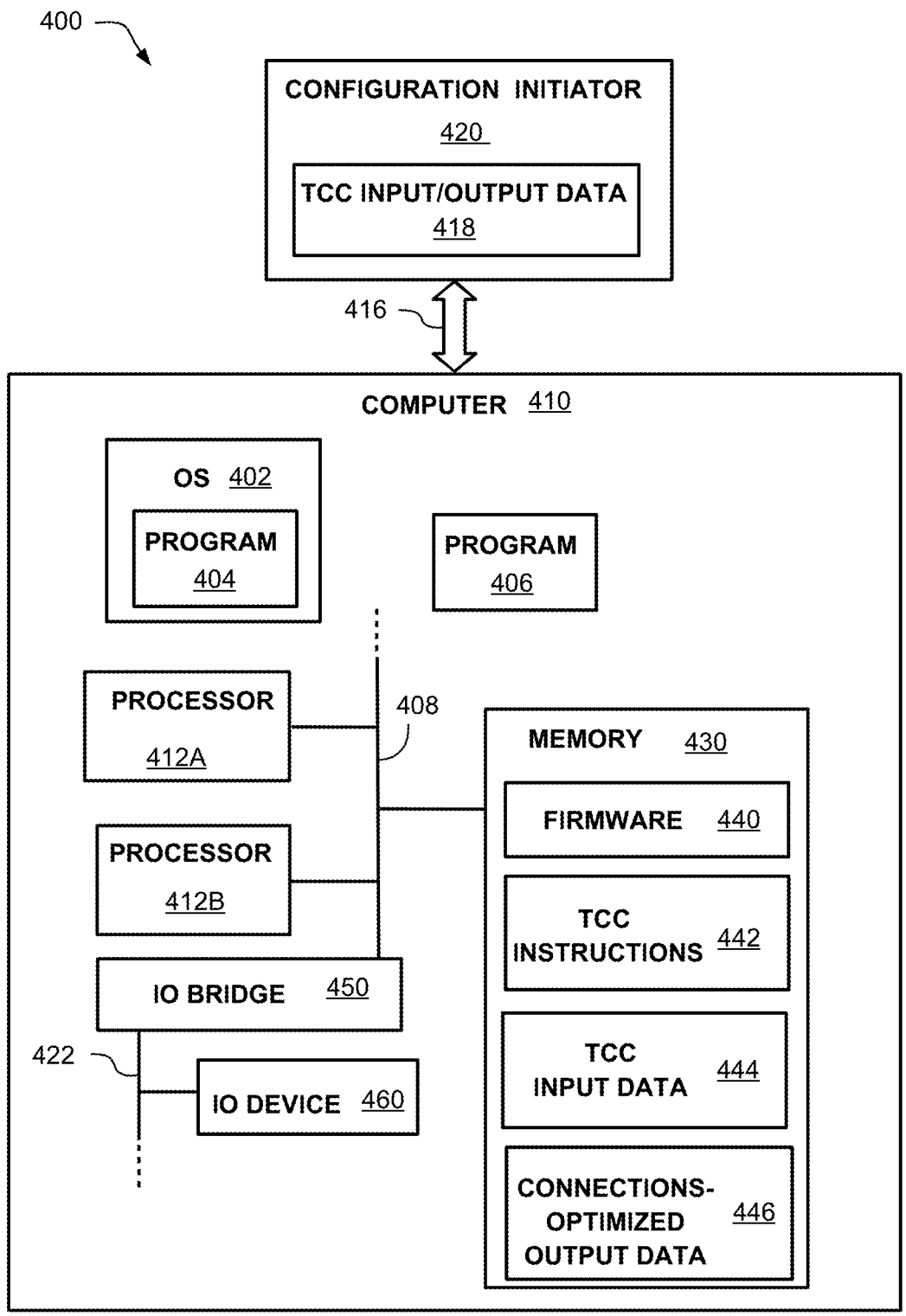
FIG. 4 is a block diagram illustrating an example computing system for performing method and operations of the disclosure.

In implementations a computing system (e.g., a computing system comprising a host and/or runtime processor) of. or communicatively coupled to, an RDS can perform operations and/or methods of the disclosure. FIG. 4 illustrates an example computing system of an RDS that can perform the methods. FIG. 4 depicts example computing system, 400, as including configuration initiator 420 (hereinafter, "initiator 420") and computer 410 coupled (operatively and/or communicatively) by interface 416. In an embodiment computer 410 can be included in RDS or, alternatively, can be coupled to an RDS. Interface 416 can couple computer 410 and initiator 420 to communicate TCC input/output data 418 between them. Initiator 420 can be any source and/or recipient of information, such as application execution information and connections-optimized output data, communicated using interface 416 (and/or, communicated via additional, or alternative, interfaces suitable for coupling initiator 420 and computer 410, not shown in FIG. 4).

Initiator 420 can be, for example, an application program of a computing system alternative to, and/or included in, computer 410. Initiator 420 can be a computer similar to computer 410. Initiator 420 can be a component of a virtual and/or cloud computing environment, such as a virtual machine, a virtualized representation of a hardware resource of computer 410 (or, a virtualized representation of a hardware resource, not shown explicitly in FIG. 4, of computing system 400 or another computing system, also not shown explicitly in FIG. 4, coupled to computing system 400, initiator 420, and/or computer 410). Initiator 420 can be a source of application data for nodes of an RDS to process. Computer 410 can be a host processor, runtime processor, and/or RP of an RDS.

In implementations, TCC input/output data 418 can comprise input data, output data, a source of input data, and/or a recipient of output data, associated with a method, apparatus, and/or application of the disclosure. For example, input data can comprise application data for an RDS to process, and/or information used by an RDS to form a connections-optimized configuration of RP to execute dataflow workers of an application, such as node and/or RP configuration data, hardware descriptions, and/or connection costs of nodes and/or RP interconnects and/or interconnection topologies of an RDS. Output data can comprise, for example, connections-optimized RP configuration to execute dataflow workers determined by a TCC instructions (e.g., TCC instructions 442) executing on computer 410.

In implementations, interface 416 can enable computer 410 to, for example, receive or otherwise access input data, included in TCC input/output data 418, and/or to present or otherwise communicate output data, included in TCC input/output data 418. In implementations, interface 416 can comprise, and/or couple computer 410 to, for example, a network (e.g., an intranet, or a public network such as the Internet), or a storage medium, such as a disk drive internal to, or otherwise coupled to, computer 410. Interface 416 can be configured to enable human input, to present output data to a human, and/or to couple computer 410 to other input and/or output devices, such as described later in regard to components of computer 410. Interface 416 can comprise an API of a TCC. It would be apparent to one of ordinary skill in the art that interface 416 can be any of a variety of interface types or mechanisms suitable for a computer, or a program operating in a computer, to receive or otherwise access input data, and/or to present or otherwise communicate output data, of an RDS and/or TCC of an RDS, such as TCC input/output data 418.

As shown in FIG. 4, computing system 400 includes computer 410 having processor 412A and processor 412B (collectively, "processors 412". In implementations processors among processors 412 can be a single processor or a multi-threaded processor, a general purpose or a special purpose processor, a co-processor, or any of a variety of processing devices that can execute computing instructions. Processors among processors 412 can comprise a host CPU of a node, and/or RPs, or portions of RPs, of one or more nodes.

In implementations a computer such as computer 410 can include one or more memories and processors, such as processor 412A and/or processor 412B can be coupled to the memories. For example, as shown in FIG. 4 processors 412 can connect by interface 408 to memory 430. In implementations a memory can be a cache memory, a main memory, a flash memory, or a combination of these or other varieties of electronic devices capable of storing information and, optionally, making the information, or locations storing the information within the memory, accessible to a processor. A memory, in an embodiment, can be formed of a single electronic (or, in some implementations, other technologies such as optical) module or can be formed of a plurality of memory modules. A memory, and/or or a memory module (e.g., an electronic packaging of a portion of a memory), in an embodiment can be, for example, one or more silicon dies or chips, or can be a multi-chip module package. Implementations can organize a memory as a sequence of bytes, words (e.g., a plurality of contiguous or consecutive bytes), or pages (e.g., a plurality of contiguous or consecutive bytes or words).

In implementations, an interface, such as interface 408, between a processor (or, processors) and a memory (or, memories) can be, for example, a memory bus common to one or more processors and one or more memories. An interface, such as interface 408, between a processor and a memory can be point to point connection between the processor and the memory, and each processor in the computer can have a point-to-point connection to each of one or more of the memories. A processor (for example, processor 412A and/or processor 412B) can be connected to a memory (e.g., memory 430) by means of a connection (not shown) to another processor (e.g., processor 412B) connected to the memory (e.g., interface 408 from processor 412B to memory 430).

In implementations, a computer can include an input/output (IO) bridge to facilitate connecting IO devices to components of the computer, and/or to other components of a computing system (e.g., to initiator 420). To illustrate, FIG. 4 depicts computer 410 including IO bridge 450. An IO bridge can interface processors and/or memories of the computer (or, other devices) to IO devices connected to the bridge. For example, in FIG. 4 IO bridge 450 is coupled to interface 408 and, using interface 422, further coupled to IO device 460. An IO bridge can connect directly to a processor or a memory (e.g., via an interface in addition, or alternative, to interface 408, not shown in FIG. 4) and/or can be a component included in a processor or a memory. An IO bridge can be, for example, a Peripheral Component Interface Express (PCI-E), or other IO bus, bridge, a switch, or a communications or data network. An IO bridge can be, or can be a component of, an IO adapter, such as a PCI-E IO adapter (not shown in FIG. 4).

In implementations IO devices can be any of a variety of peripheral IO devices or 10 adapters connecting to peripheral IO devices. For example, IO device 460 can be a graphic card, keyboard or other input device, a hard drive or other storage device, a network interface cards, etc. IO device 460 can be an IO adapter, such as a PCI-E adapter, and the IO device can connect components (e.g., processors or memories) of a computer to IO devices (e.g., disk drives, Ethernet networks, video displays, keyboards, mice, etc.).

In implementations, a computer can include instructions executable by one or more processors (or, processing elements, such as threads of a processor). The instructions can be a component of one or more programs. The programs, or the instructions, can be stored in, and/or utilize, one or more memories of a computer. To illustrate, in the example of FIG. 4 computer 410 includes a plurality of programs, such as program 404 and program 406. In an embodiment a program can be, for example, an application program, an operating system (or, a function or component of an operating system), or a utility or built-in function of the computer, or a computer included in a computing system or device. A program can be a hypervisor, and the hypervisor can, for example, manage sharing resources of the computer (e.g., a processor or regions of a memory, such as processor 412A and/or processor 412B and memory 430) or access to an IO device, such as IO device 460) among a plurality of programs or OSes.

A program can be a program that embodies the methods, or portions thereof, of the disclosure. A program can be a program that embodies the methods, or portions thereof, of the disclosure. For example, in an embodiment a program can be a program that executes on a processor of computer 410 to perform operations of example method 200 and/or method 300 of FIGS. 2 and 3, respectively.

In implementations, programs can be "stand-alone" programs, and such stand-alone programs can execute on processors and use memory within a computer directly, without requiring another program to control their execution or their use of resources of the computer. For example, in FIG. 4 program 406 can be a stand-alone program. In an embodiment a stand-alone program can perform particular functions within the computer, such as controlling, or interfacing (e.g., access by other programs) an IO interface or IO device. A stand-alone program can, for example, manage the operation, or access to, a memory. A Basic I/O Subsystem (BIOS), or a computer boot program (e.g., a program that can load and initiate execution of other programs) can be a standalone program.

In implementations a computer can include one or more operating systems, and an operating system can control the execution of other programs such as, for example, to start or stop a program, or to manage resources of the computer used by a program. For example, in FIG. 4 computer 410 includes operating system (OS) 402, which can include, or manage execution of, one or more programs, such as OS 402 including (or, managing) program 404. In some implementations, an operating system can function as a hypervisor.

A program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 410 includes firmware 440 stored in memory 430. In other implementations, firmware can be embodied as instructions (e.g., comprising a computer program product) on a storage medium (e.g., a CD ROM, a flash memory, or a disk drive), and the computer can access the instructions from the storage medium.

In implementations, a memory of, or coupled to, a computer can store instructions executable by a processor of a computer. For example, as illustrated in FIG. 4 memory 430 includes firmware 440 and TCC instructions 442, which can include instructions executable by processors of computer 410, such as processor 412A and/or processor 412B, to perform operations of methods of the disclosure. For example, TCC instructions 442 can include instructions for determining a connections-optimized RP configuration of an RDS.

In implementations, a memory of, and/or coupled to, a computer can store input data, such as can be used by the instructions. For example, as also shown in FIG. 4, memory 430 includes RP and topology input data 444. In an embodiment, RP and topology input data 444 can include data (e.g., data included in TCC input/output data 418) used by TCC instructions 442 in performing operations of methods of the disclosure, such as to determine RPs, worker logical topologies, RP and node interconnection topologies, and/or connection costs associated with communications routes among RPs and/or nodes of an RDS.

Similarly, in an embodiment a memory of, and/or coupled to, a computer can store output data, such as the results of executing the instructions. As illustrated in FIG. 4, memory 430 includes connections-optimized output data 446, which can comprise, in an embodiment, the results of executing instructions, such as instructions included in firmware 440, programs 404 and/or 406, and/or TCC instructions 442 performing operations or methods of the disclosure. For example, connections-optimized output data 446 can include results of TCC instructions 442 determining a connections-optimized RP configuration within and among nodes of an RDS.

The example computing system 400 and computer 410 is not intended to limit implementations. In implementations, computing system 400 can include a plurality of processors and/or interfaces not shown in FIG. 4 and can include other elements or components, such as networks, network routers or gateways, storage systems, server computers, virtual computers or virtual computing and/or IO devices, cloud-computing environments, and so forth. It would be evident to one of ordinary skill in the art to include a variety of devices interconnected in a variety of manners in a computer and/or computing system embodying aspects and features of the disclosure.

For example, with reference again to FIG. 4, in implementations computer 410 can be a desktop or laptop computer; a tablet computer, mobile computing device, or cellular phone; or, a server computer, a high-performance computer, a supercomputer, a virtual machine or resource of a virtual computing system, and/or a resource of a cloud computing system. Computer 410 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one of ordinary skill in the art that a computer, computing device, and/or computing system, embodying aspects and features of the disclosure can be any of a variety of computing devices having processors and, optionally, memories and/or programs.

Implementations can comprise a computer program product and can include a computer readable storage medium (or media) having computer readable program instructions of the computer program product incorporated therein. It will be understood by one of ordinary skill in the art that computer readable program instructions can implement each or any combination of operations and/or structure of the disclosure, such as illustrated by the drawings and described herein.

The computer readable program instructions can be provided to one or more processors, and/or other elements, of a computing system or apparatus to produce a machine which can execute, via the processor(s), to implement operations and/or actions similar or equivalent to those of the disclosure. The computer readable program instructions can be stored in a computer readable storage medium that can direct one or more processors, and/or other elements, of a computing system or apparatus to function in a particular manner, such that the computer readable storage medium comprises an article of manufacture including instructions to implement operations and/or structures similar or equivalent to those of the disclosure.

The computer readable program instructions of the computer program product can cause one or more processors to perform operations of the disclosure, such as operations of an RDS to execute an application and/or a TCC to determine a connections-optimized RP configuration of the RDS to execute the application. A sequence of program instructions, and/or an assembly of one or more interrelated programming modules, of the computer program product can direct one or more one or more processors and/or computing elements of a computing system to implement the elements and/or operations of the disclosure including, but not limited to, the structures and operations illustrated and/or described in the present disclosure.

A computer readable storage medium can comprise any tangible (e.g., hardware) device, or combination of tangible devices, that can store instructions of the computer program product and that can be read by a computing element to download the instructions for use by a processor. A computer readable storage medium can comprise, but is not limited to, electronic, magnetic, optical, electromagnetic, and/or semiconductor storage devices, or any combination of these. A computer readable storage medium can comprise a portable storage medium, such as a magnetic disk/diskette, optical disk (CD or DVD); a volatile and/or non-volatile memory; a memory stick, a mechanically encoded device, and any combination of these. A computer readable storage medium, as used herein, is not to be construed as being transitory electrical and/or electromagnetic signals per se.

The computer readable program instructions can be communicated from the computer readable storage medium to the one or more computing/processing devices, via a programming API of a computing system, and/or a communications interface of a computing system, having access to the computer readable storage medium, and/or a programming API of a computing system, and/or a communications interface of the one or more computing/processing devices. The API(s) and/or communications interface(s) can couple communicatively and/or operatively to a network, such as the Internet, a local area network, a wide area network, and/or a wireless network. The API(s) and/or communications interface(s) can receive the computer readable program instructions read from computer readable storage medium and can forward the computer readable program instructions to the one or more computing/processing devices via the API(s), communications interface(s), and/or network.

In implementations, the computer readable program instructions of the computer program product can comprise machine language and/or assembly language instructions, instruction-set-architecture (ISA) instructions, microcode and/or firmware instructions, state-setting data, configuration data for integrated circuitry, source code, and/or object code. The instructions and/or data can be written in any combination of one or more programming languages.

The computer readable program instructions can execute entirely, or in part, on a user's computer, as a stand-alone software package; partly on a user's computer and partly on a remote computer; or, entirely on a remote computer. A remote computer can be connected to a user's computer through any type of network, including a local area network (LAN) or a wide area network (WAN). In implementations, electronic circuitry including, for example, FPGA, PLAs, and or CGRAs can execute the computer readable program instructions by utilizing state information of the computer readable program instructions to configure the electronic circuitry to perform operations or elements of the disclosure, such as illustrated by the drawings and described herein.

In implementations, computer readable program instructions can also be loaded onto a computing system, or component(s) thereof, to cause the computing system and/or component(s) thereof to perform a series of operational steps to produce a computer implemented process, such that the instructions which execute on the computing system, or component(s) thereof, implement the operations or elements of the disclosure, such as illustrated by the drawings and described herein.

The flowchart and block diagrams in the drawings illustrate the architecture, functionality, and operation of possible implementations of systems, methods, and computer program products according to various implementations of the disclosure. Individual elements illustrated in the drawings—such as individual operations illustrated in the flowcharts or individual blocks of block diagrams—may represent a module, segment, or portion of executable instructions for implementing the disclosed function(s).

In various alternative implementations, particular operations may occur in an order differing from that illustrated in the examples of the drawings. For example, two operations shown in succession in a diagram of the disclosure may, in a particular embodiment, be executed substantially concurrently, or may sometimes be executed in a reverse order, depending upon the functionality involved. It will be further noted that particular blocks of the block diagrams, operations of the flowchart illustrations, and/or combinations of blocks in the block diagrams and/or flowchart illustrations, can be implemented using special purpose hardware and/or systems that, individually or in combination, perform the specified functions, acts, and/or computer instructions.

The examples of the various implementations of the disclosure are presented for purposes of illustration and are not intended to be exhaustive or to limit the implementations disclosed and/or that may be conceived within the scope of the disclosure. Modifications and variations will be apparent to those of ordinary skill in the art within the scope and spirit of the disclosure. Terminology used herein, and the examples disclosed, are chosen to illustrate the principles of the implementations, the practical application or technical improvement over alternative technologies, and to enable others of ordinary skill in the art to understand the implementations disclosed herein.

Terminology used herein, and the examples disclosed, are chosen to illustrate the principles of the implementations, the practical application or technical improvement over alternative technologies, and to enable others of ordinary skill in the art to understand the implementations disclosed herein. The disclosure illustrates various example implementations, and the examples are intended to illustrate principles and aspects of the disclosure, but are not intended to limit implementations, nor intended to be exhaustive of implementations that may be conceived within the scope of the disclosure. It would be apparent to one of ordinary skill in the art that alternative implementations can comprise modifications and combinations within the spirit of the disclosure and the scope of the claims.

As can be seen in the foregoing examples, implementations can comprise methods, systems, and computer program products. A summary of such methods, systems, and computer programs can comprise the following:

Example Embodiment 1

A computer-implemented method comprises determining, by a topological communications configurator (TCC) of a first computing system, an internodal interconnection topology of a plurality of compute nodes of a second computing system, the internodal interconnection topology comprising an internodal fabric; determining, by the TCC, based on the internodal interconnection topology, a set of internodal communications routes communicatively interconnecting, via the internodal fabric, a set of intranodal segments among a plurality of intranodal segments, each of the plurality of intranodal segments comprising an intranodal interconnection of processors included in respective nodes among the plurality of compute nodes, each of the plurality of intranodal segments corresponding to a respective intranodal portion of a worker logical topology comprising compute workers configured to execute an application of the second computing system; determining, by the TCC, internodal communications costs corresponding to communications routes among the set of internodal communications routes; and determining, by the TCC, based on the internodal communications costs, a connections-optimized configuration of interconnected segments, the interconnected segments among the set of intranodal segments, the interconnected segments corresponding to an internodal portion of the worker logical topology.

Example Embodiment 2

The method of example embodiment 1, wherein the internodal communication routes comprise communications routes between pairs of intranodal segments among the set of intranodal segments.

Example Embodiment 3

The method of example embodiment 1, wherein a segment among the plurality of intranodal segments comprises dataflow processors of the segment configured to communicatively couple to one predecessor and one successor dataflow processor of the segment.

Example Embodiment 4

The method of example embodiment 1, wherein the determining, by the TCC, the connections-optimized configuration of integrated segments comprises the TCC determining, further based on the internodal communications costs, a cost-optimized interconnection of the interconnected segments to form a ring topology among the interconnected segments.

Example Embodiment 5

The method of example embodiment 1, wherein a first and a second segment, among the plurality of intranodal segments, each comprises a head and a tail dataflow processor; and, wherein the method determining, by the TCC, the connections-optimized configuration of integrated segments comprises the TCC determining, further based on the internodal communications costs, a cost-optimized interconnection of the tail dataflow processor of the first segment and a head dataflow processor of the second segment.

Example Embodiment 6

The method of example embodiment 1, wherein the method further comprises the TCC determining a connections-optimized configuration of dataflow processors included in a first segment of a first node, the first segment among the plurality of intranodal segments, the first node among the plurality of compute nodes.

Example Embodiment 7

The method of example embodiment 6, the TCC determining the connections-optimized configuration of dataflow processors included in the first segment comprising the TCC: determining an intranodal interconnection topology of the first node, the intranodal interconnection topology comprising interconnections of the dataflow processors included in the first segment via an intranode fabric; determining, based on the intranodal interconnection topology, a set of intranodal communications routes communicatively interconnecting, via the intranodal fabric, the dataflow processors included in the first segment; determining intranodal communications costs corresponding to communications routes among the set of intranodal communications routes; and determining, based on the intranodal communications costs, a connections-optimized configuration of the dataflow processors included in the first segment.

Example Embodiment 8

The method of example embodiment 1, wherein dataflow processors among the dataflow processors included in respective nodes comprise reconfigurable dataflow processors.

Example Embodiment 9

The method of example embodiment 1, wherein the second computing system comprises a data-parallel computing system.

Example Embodiment 10

The method of example embodiment 1, wherein the compute workers comprise data-parallel workers configured to execute operations of the application, on dataflow processors among the dataflow processors included in the respective nodes among the plurality of compute nodes, as a pipeline.

Example Embodiment 11

The method of example embodiment 1, wherein the internodal connections costs are based on performance characteristics selected from a group consisting of: performance characteristics of the internodal fabric, and performance characteristics of an interconnect coupling a first segment, among the plurality of segments, and the internodal fabric.

Example Embodiment 12

The method of example embodiment 11, wherein a performance characteristic among the performance characteristics of the internodal fabric is selected from a group consisting of: a utilization of the internodal fabric; a throughput of a communications route through the internodal fabric; a latency of a communications route through the internodal fabric; and a physical locality of the internodal fabric within the second computing system.

Example Embodiment 13

The method of example embodiment 11, wherein a performance characteristic among the performance characteristics of the interconnect is selected from a group consisting of: a utilization of the interconnect; a throughput of the interconnect; a data rate of the interconnect; a communications latency of the interconnect and a physical locality of the interconnect within the second computing system.

Example Embodiment 14

A system comprises: a first computing system comprising a first dataflow processor, a first memory, and a topological communications configurator (TCC); a second computing system comprising a plurality of compute nodes, compute nodes among the plurality of compute nodes comprising at least one dataflow processor, each of the at least one dataflow processor configured to execute a compute worker among a plurality of compute workers, the plurality of compute workers configured to execute a computing application of the second computing system; and, an internodal fabric configured to communicatively couple compute nodes among the plurality of compute nodes.

The TCC is configured to: determine an internodal interconnection topology of the plurality of compute nodes, the internodal interconnection topology comprising the internodal fabric; determine, based on the internodal interconnection topology, a set of internodal communications routes communicatively interconnecting, via the internodal fabric, a set of intranodal segments among a plurality of intranodal segments, each of the plurality of intranodal segments comprising an intranodal interconnection of dataflow processors included in respective nodes among the plurality of compute nodes, each of the plurality of intranodal segments corresponding to a respective intranodal portion of a worker logical topology comprising the compute workers; determine internodal communications costs corresponding to communications routes among the set of internodal communications routes; and determine, based on the internodal communications costs, a connections-optimized configuration of interconnected segments, the interconnected segments among the set of intranodal segments, the interconnected segments corresponding to an internodal portion of the worker logical topology.

Example Embodiment 15

The system of example embodiment 14, wherein the internodal communication routes comprise communications routes between pairs of intranodal segments among the set of intranodal segments.

Example Embodiment 16

The system of example embodiment 14, wherein a segment among the plurality of intranodal segments comprises a set of dataflow processors, included in the segment, configured to communicatively couple to one predecessor dataflow processor and one successor dataflow processor among the dataflow processors included in the segment.

Example Embodiment 17

The system of example embodiment 14, wherein the TCC configured to determine the connections-optimized configuration of integrated segments comprises the TCC further configured to determine, further based on the internodal communications costs, a cost-optimized interconnection of the interconnected segments to form a ring topology among the interconnected segments.

Example Embodiment 18

The system of example embodiment 14, wherein a first segment, among the plurality of intranodal segments, comprises a head dataflow processor; wherein a second segment, among the plurality of intranodal segments, comprises a tail dataflow processor; and, wherein the TCC configured to determine the connections-optimized configuration of integrated segments comprises the TCC further configured to determine, further based on the internodal communications costs, a cost-optimized interconnection of the head dataflow processor, included in the first segment, and the tail dataflow processor included in the second segment.

Example Embodiment 19

The system of example embodiment 14, wherein the TCC is further configured to determine a connections-optimized configuration of a set of dataflow processors of a node among the plurality of compute nodes, the set of dataflow processors included in a segment, among the plurality of intranodal segments, included in the node.

Example Embodiment 20

The system of example embodiment 19, wherein the TCC configured to determine the connections-optimized configuration of dataflow processors included in the segment comprises the TCC further configured to: determine an intranodal interconnection topology of the node, the intranodal interconnection topology comprising interconnections of the set of dataflow processors via an intranode fabric; determine, based on the intranodal interconnection topology, a set of intranodal communications routes communicatively interconnecting, via the intranode fabric, the set of dataflow processors; determine intranodal communications costs corresponding to communications routes among the set of intranodal communications routes; and determine based on the intranodal communications costs, a connections-optimized configuration of the set of dataflow processors.

Example Embodiment 21

The system of example embodiment 14, wherein a dataflow processor among the at least one dataflow processor included in a node, among the plurality of compute nodes, comprises a reconfigurable processor.

Example Embodiment 22

The system of example embodiment 14, wherein the second computing system comprises a dataflow computing system.

Example Embodiment 23

The system of example embodiment 14, wherein a set of compute workers, among the plurality of compute workers, is configured to execute operations of the computing application as a pipeline of compute workers.

Example Embodiment 24

The system of example embodiment 14, wherein the TCC configured to determine the internodal communications costs comprises the TCC configured to determine the internodal communications costs based on performance characteristics selected from a group consisting of: performance characteristics of the internodal fabric, and performance characteristics of an interconnect coupling a first segment, among the plurality of internodal segments, and the internodal fabric.

Example Embodiment 25 wherein a performance characteristic among the performance characteristics of the internodal fabric is selected from a group consisting of: performance characteristics of the internodal fabric, and performance characteristics of an interconnect coupling a first segment, among the plurality of internodal segments, and a physical locality of the internodal fabric within the second computing system.

Example Embodiment 26

The system of example embodiment 24, wherein a performance characteristic among the performance characteristics of the interconnect is selected from a group consisting of: a utilization of the interconnect; a throughput of the interconnect; a data rate of the interconnect; a communications latency of the interconnect and a physical locality of the interconnect within the second computing system.

Example Embodiment 27

A computer program product comprising a computer readable storage medium having first program instructions embodied therewith. The first program instructions are executable by at least one processor to cause the at least one processor to: determine an internodal interconnection topology of a plurality of compute nodes of a computing system, the internodal interconnection topology comprising an internodal fabric; and, determine, based on the internodal interconnection topology, a set of internodal communications routes communicatively interconnecting, via the internodal fabric, a set of intranodal segments among a plurality of intranodal segments, each of the plurality of intranodal segments comprising an intranodal interconnection of dataflow processors included in respective nodes among the plurality of compute nodes, each of the plurality of intranodal segments corresponding to a respective intranodal portion of a worker logical topology comprising compute workers configured to execute an application of the computing system.

The first program instructions are executable by at least one processor to further cause the at least one processor to: determine internodal communications costs corresponding to communications routes among the set of internodal communications routes; and determine, based on the internodal communications costs, a connections-optimized configuration of interconnected segments, the interconnected segments among the set of intranodal segments, the interconnected segments corresponding to an internodal portion of the worker logical topology.

Example Embodiment 28

The computer program product of example embodiment 27, wherein the computer readable storage medium has second program instructions embodied therewith, wherein the second program instructions are executable by the at least one processor to cause the at least one processor to determine a cost-optimized interconnection of the interconnected segments to form a ring topology among the interconnected segments.

Example Embodiment 29

The computer program product of example embodiment 27, wherein the computer readable storage medium has second program instructions embodied therewith, wherein the second program instructions are executable by the at least one processor to cause the at least one processor to determine a connections-optimized configuration of dataflow processors included in a first segment of a first node, the first segment among the plurality of intranodal segments, the first node among the plurality of compute nodes.

Example Embodiment 30

The computer program product of example embodiment 29, wherein the computer readable storage medium has third program instructions embodied therewith, wherein the third program instructions are executable by the at least one processor to cause the at least one processor to: determine an intranodal interconnection topology of the first node, the intranodal interconnection topology comprising interconnections of the dataflow processors included in the first segment via an intranode fabric; determine, based on the intranodal interconnection topology, a set of intranodal communications routes communicatively interconnecting, via the intranodal fabric, the dataflow processors included in the first segment; determine intranodal communications costs corresponding to communications routes among the set of intranodal communications routes; and determine, based on the intranodal communications costs, a connections-optimized configuration of the dataflow processors included in the first segment.

What is claimed is:
1. A computer-implemented method, the method comprising:
determining, by a topological communications configurator (TCC) of a first computing system, an internodal interconnection topology of a plurality of compute nodes of a second computing system, the internodal interconnection topology comprising an internodal fabric;
determining, by the TCC, based on the internodal interconnection topology, internodal communications routes interconnecting, via the internodal fabric, a set of intranodal segments among a plurality of intranodal segments, each of the plurality of intranodal segments comprising an intranodal interconnection of dataflow processors included in respective nodes among the plurality of compute nodes, each of the plurality of intranodal segments corresponding to a respective portion of a worker logical topology comprising compute workers configured to execute an application of the second computing system;
determining, by the TCC, internodal communications costs corresponding to communications routes among the internodal communications routes; and
determining, by the TCC, based on the internodal communications costs, a connections-optimized configuration of interconnected segments, the interconnected segments among the set of intranodal segments, the interconnected segments corresponding to an internodal portion of the worker logical topology.

2. The method of claim 1, the method determining, by the TCC, the connections-optimized configuration of integrated segments comprising the TCC determining, further based on the internodal communications costs, a cost-optimized interconnection of the interconnected segments to form a ring topology among the interconnected segments.

3. The method of claim 1, wherein a first segment and a second segment, among the plurality of intranodal segments, each comprises a head and a tail dataflow processor; and
wherein the method determining, by the TCC, the connections-optimized configuration of integrated segments comprises the TCC determining, further based on the internodal communications costs, a cost-optimized interconnection of the tail dataflow processor of the first segment and a head dataflow processor of the second segment.

4. The method of claim 1, the method further comprising the TCC determining a connections-optimized configuration of dataflow processors included in a first segment of a first node, the first segment among the plurality of intranodal segments, the first node among the plurality of compute nodes.

5. The method of claim 1, wherein the compute workers comprise data-parallel workers configured to execute operations of the application, on dataflow processors among the dataflow processors included in the respective nodes among the plurality of compute nodes, as a pipeline.

6. The method of claim 1, wherein the internodal communications costs are based on performance characteristics selected from a group consisting of: performance characteristics of the internodal fabric, and performance characteristics of an interconnect coupling a first segment, among the plurality of intranodal segments, and the internodal fabric.

7. The method of claim 6, wherein a performance characteristic among the performance characteristics of the internodal fabric is selected from a group consisting of: a utilization of the internodal fabric; a throughput of a communications route through the internodal fabric; a latency of a communications route through the internodal fabric; and a physical locality of the internodal fabric within the second computing system.

8. The method of claim 6, wherein a performance characteristic among the performance characteristics of the interconnect is selected from a group consisting of: a utilization of the interconnect; a throughput of the interconnect; a data rate of the interconnect; a communications latency of the interconnect and a physical locality of the interconnect within the second computing system.

9. A system, the system comprising:
a first computing system comprising a first processor and a topological communications configurator (TCC) comprising a computing program configured to execute on the first processor;
a second computing system comprising a plurality of compute nodes, compute nodes among the plurality of compute nodes comprising at least one dataflow processor, each of the at least one dataflow processor configured to execute a compute worker among a plurality of compute workers, the plurality of compute workers configured to execute a computing application of the second computing system; and
an internodal fabric configured to communicatively couple compute nodes among the plurality of compute nodes,
wherein the TCC is configured to:
determine an internodal interconnection topology of the plurality of compute nodes, the internodal interconnection topology comprising the internodal fabric;
determine, based on the internodal interconnection topology, internodal communications routes communicatively interconnecting, via the internodal fabric, a set of intranodal segments among a plurality of intranodal segments, each of the plurality of intranodal segments comprising an intranodal interconnection of dataflow processors included in respective nodes among the plurality of compute nodes, each of the plurality of intranodal segments comprising a set of compute workers, among the plurality of compute workers, executed by the dataflow processors included in a node among the respective nodes, the set of compute workers included in a worker logical topology;
determine internodal communications costs corresponding to communications routes among the internodal communications routes; and
determine, based on the internodal communications costs, a connections-optimized configuration of interconnected segments among the set of intranodal segments.

10. The system of claim 9, wherein the TCC configured to determine the connections-optimized configuration of integrated segments comprises the TCC further configured to determine, further based on the internodal communications costs, a cost-optimized interconnection of the interconnected segments to form a ring topology among the interconnected segments.

11. The system of claim 9, wherein a first segment, among the plurality of intranodal segments, comprises a head dataflow processor;
wherein a second segment, among the plurality of intranodal segments, comprises a tail dataflow processor; and
wherein the TCC configured to determine the connections-optimized configuration of integrated segments comprises the TCC further configured to determine, further based on the internodal communications costs, a cost-optimized interconnection of the head dataflow processor, included in the first segment, and the tail dataflow processor included in the second segment.

12. The system of claim 9, wherein the TCC is further configured to determine a connections-optimized configuration of a set of dataflow processors of a node among the plurality of compute nodes, the set of dataflow processors included in a segment, among the plurality of intranodal segments, included in the node.

13. The system of claim 12, wherein the TCC configured to determine the connections-optimized configuration of dataflow processors included in the segment comprises the TCC further configured to:
determine an intranodal interconnection topology of the node, the intranodal interconnection topology comprising interconnections of the set of dataflow processors via an intranodal fabric;
determine, based on the intranodal interconnection topology, a set of intranodal communications routes communicatively interconnecting, via the intranodal fabric, the set of dataflow processors;
determine intranodal communications costs corresponding to communications routes among the set of intranodal communications routes; and
determine based on the intranodal communications costs, a connections-optimized configuration of the set of dataflow processors.

14. The system of claim 9, wherein the set of compute workers is configured to execute operations of the computing application as a pipeline of compute workers.

15. The system of claim 9, wherein the TCC configured to determine the internodal communications costs comprises the TCC configured to determine the internodal communications costs based on performance characteristics selected from a group consisting of: performance characteristics of the internodal fabric, and performance characteristics of an interconnect coupling a first segment, among the plurality of intranodal segments, and the internodal fabric.

16. The system of claim 15, wherein a performance characteristic among the performance characteristics of the internodal fabric is selected from a group consisting of: performance characteristics of the internodal fabric, performance characteristics of the interconnect coupling the first segment and the internodal fabric, and performance characteristics associated with a physical locality of the internodal fabric within the second computing system.

17. The system of claim 15, wherein a performance characteristic among the performance characteristics of the interconnect is selected from a group consisting of: a utilization of the interconnect, a throughput of the interconnect, a data rate of the interconnect, a communications latency of the interconnect, and a physical locality of the interconnect within the second computing system.

18. A computer program product, the computer program product comprising a computer readable storage medium having first program instructions embodied therewith, wherein the first program instructions are executable by at least one processor to cause the at least one processor to:

determine an internodal interconnection topology of a plurality of compute nodes of a computing system, the internodal interconnection topology comprising an internodal fabric;

determine, based on the internodal interconnection topology, internodal communications routes communicatively interconnecting, via the internodal fabric, a set of intranodal segments among a plurality of intranodal segments, each of the plurality of intranodal segments comprising an intranodal interconnection of processors included in respective nodes among the plurality of compute nodes, each of the plurality of intranodal segments corresponding to a respective portion of a worker logical topology comprising compute workers configured to execute an application of the computing system;

determine internodal communications costs corresponding to communications routes among the internodal communications routes; and determine, based on the internodal communications costs, a connections-optimized configuration of interconnected segments, the interconnected segments among the set of intranodal segments, the interconnected segments corresponding to an internodal portion of the worker logical topology.

19. The computer program product of claim 18, wherein the computer readable storage medium has second program instructions embodied therewith, wherein the second program instructions are executable by the at least one processor to cause the at least one processor to determine a cost-optimized interconnection of the interconnected segments to form a ring topology among the interconnected segments.

20. The computer program product of claim 18, wherein the computer readable storage medium has second program instructions embodied therewith, wherein the second program instructions are executable by the at least one processor to cause the at least one processor to determine a connections-optimized configuration of processors included in a first segment of a first node, the first segment among the plurality of intranodal segments, the first node among the plurality of compute nodes.

* * * * *